(12) United States Patent
Abram et al.

(10) Patent No.: US 12,556,395 B2
(45) Date of Patent: Feb. 17, 2026

(54) SECURE DISTRIBUTED SAMPLERS FOR CRYPTOGRAPHIC REFERENCE STRINGS

(71) Applicant: NTT Research, Inc., Sunnyvale, CA (US)

(72) Inventors: Damiano Abram, Aarhus (DK); Brent Waters, Austin, TX (US); Mark Zhandry, San Francisco, CA (US)

(73) Assignee: NTT Research, Inc., Sunnyvale, CA (US)

( * ) Notice: Subject to any disclaimer, the term of this patent is extended or adjusted under 35 U.S.C. 154(b) by 132 days.

(21) Appl. No.: 18/652,268

(22) Filed: May 1, 2024

(65) Prior Publication Data

US 2026/0005859 A1   Jan. 1, 2026

Related U.S. Application Data

(60) Provisional application No. 63/499,260, filed on May 1, 2023.

(51) Int. Cl.
*H04L 9/32* (2006.01)
*H04L 9/16* (2006.01)

(52) U.S. Cl.
CPC .............. *H04L 9/3221* (2013.01); *H04L 9/16* (2013.01)

(58) Field of Classification Search
CPC ................................. H04L 9/3221; H04L 9/16
USPC .......................................................... 713/168
See application file for complete search history.

(56) References Cited

U.S. PATENT DOCUMENTS

| | | | | |
|---|---|---|---|---|
| 2017/0264426 | A1* | 9/2017 | Joye | H04L 9/3247 |
| 2020/0097648 | A1* | 3/2020 | Soriente | H04L 63/0421 |
| 2022/0329432 | A1* | 10/2022 | Kawaguchi | H04L 9/3247 |
| 2023/0208643 | A1* | 6/2023 | Watson | H04L 63/0407 |
| | | | | 713/176 |
| 2024/0340186 | A1* | 10/2024 | Watson | H04L 9/0618 |

* cited by examiner

*Primary Examiner* — Michael S McNally
(74) *Attorney, Agent, or Firm* — CipherLaw

(57) ABSTRACT

The disclosed technology pertains to a method and system for generating a common reference string for use by multiple parties in cryptographic operations. The method involves executing a generation algorithm that creates encryption and decryption codes, generates non-interactive zero-knowledge proofs, and outputs a message for each party. These messages are published to a public domain and accessed by all parties. A derivation algorithm is then executed at each party to derive a common reference string from the set of messages by combining them. The system comprises a computerized processor configured to execute these algorithms. The common reference string is stored in a computerized storage device.

20 Claims, 22 Drawing Sheets

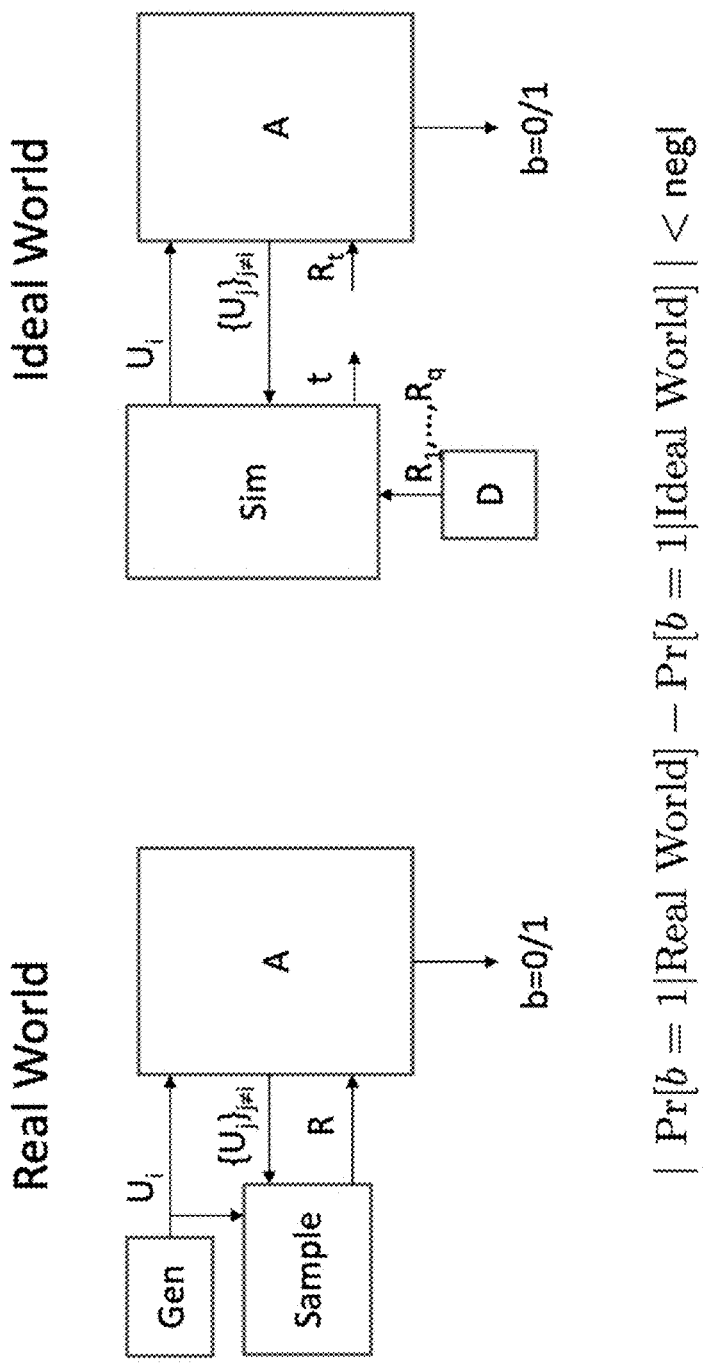

Figure 1: An informal explanation of malicious security for distributed samplers. Here, Gen is the algorithm for honestly generating the third party messages $U_j$ and Sample is the algorithm that combines the messages into the derived CRS $R$. $i$ is the honest user, $t$ is the simulator's choice of which of the honest CRS samples $R_1, \ldots, R_q$ to use.

$$| \Pr[b = 1 | \text{Real World}] - \Pr[b = 1 | \text{Ideal World}] | < \text{negl}$$

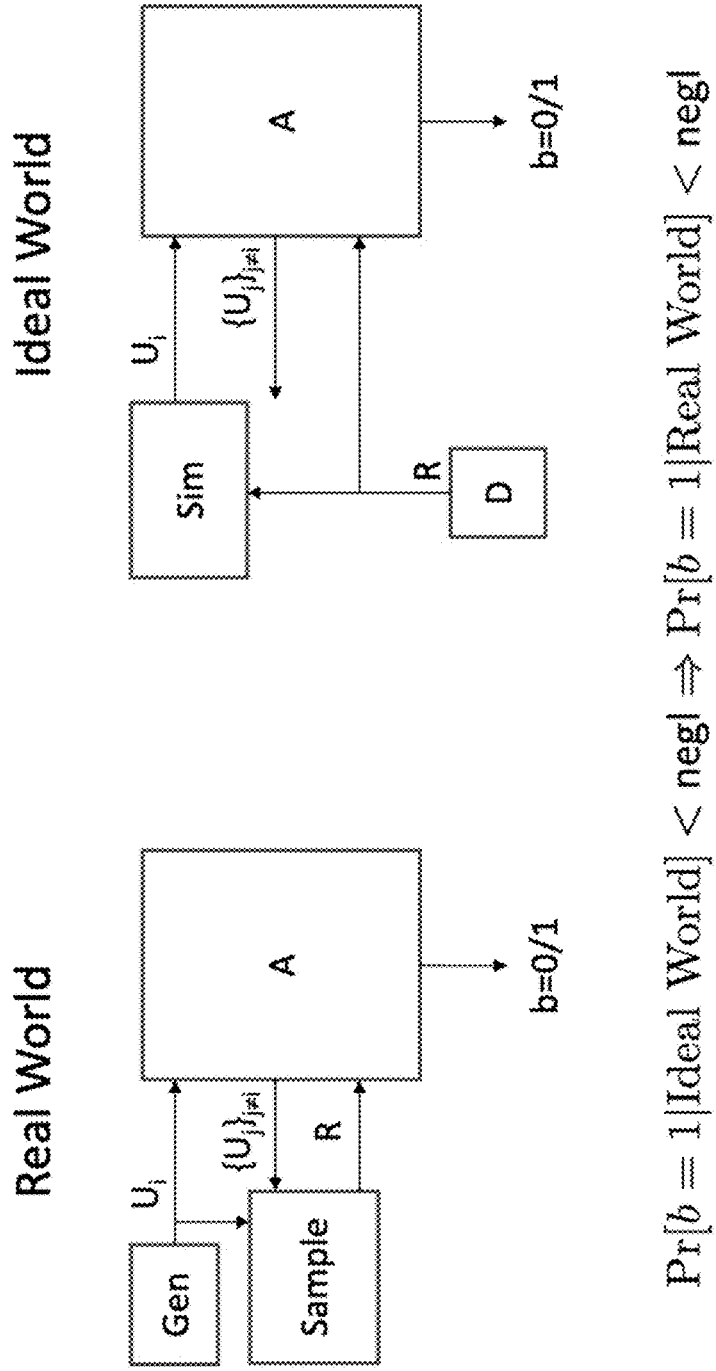
Figure 2: An informal explanation of hardness-preserving security for distributed samplers. It is the same as Figure 1, except that there is only a single honest CRS in the ideal world, and the relation between success probabilities in the two worlds is relaxed.

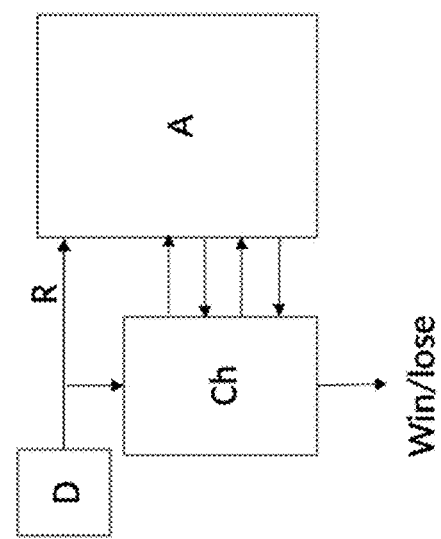
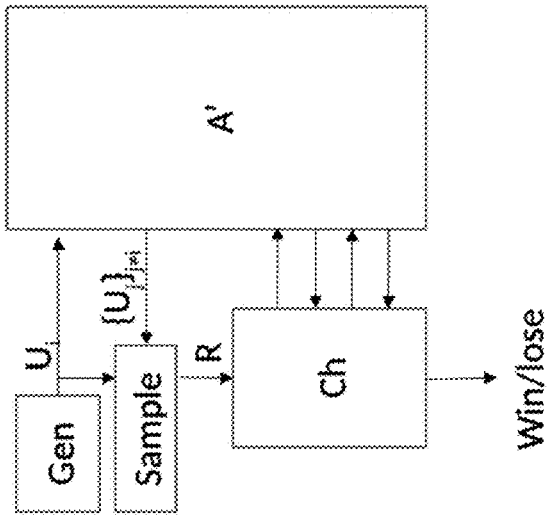
Figure 3: Search games and their compilations. The figure on the left is a search game utilizing an honest CRS, while the figure on the right is the compiled game using a distributed sampler to generate the CRS.

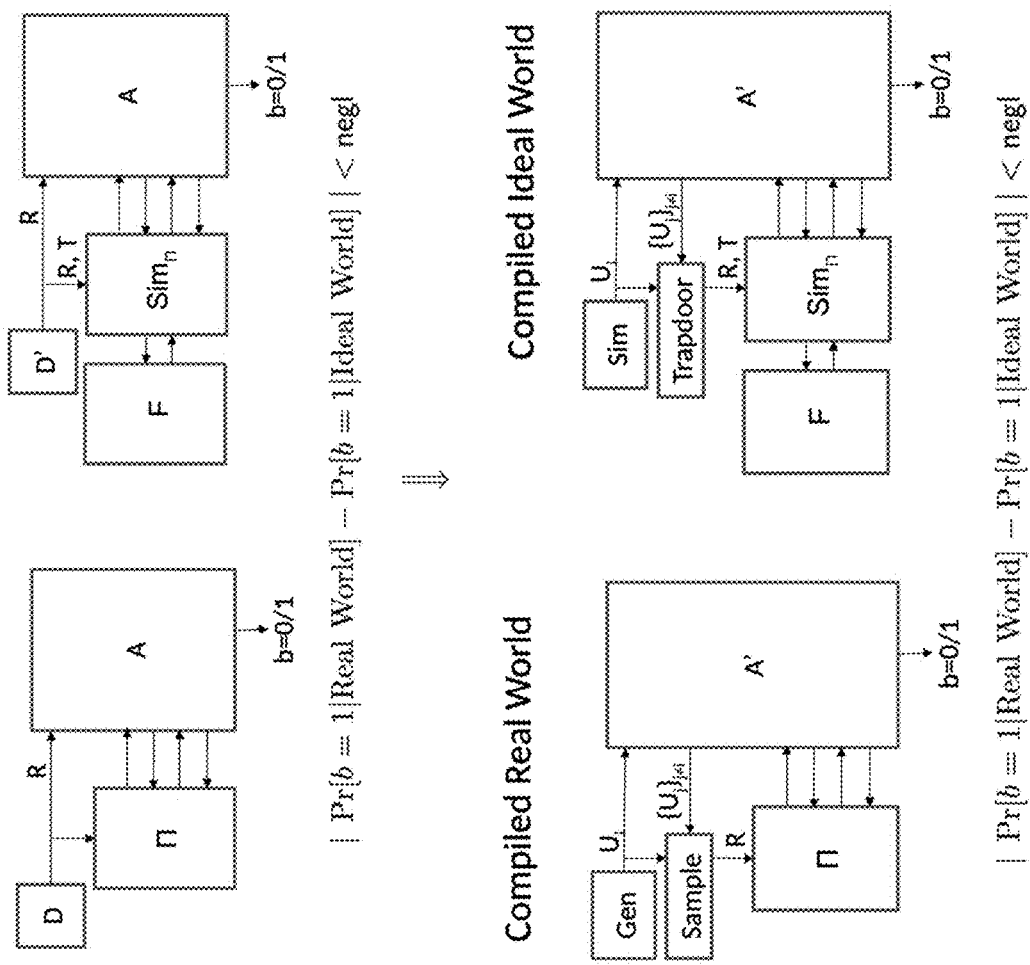
Figure 4: An informal explanation of indistinguishability-preserving security for distributed samplers.

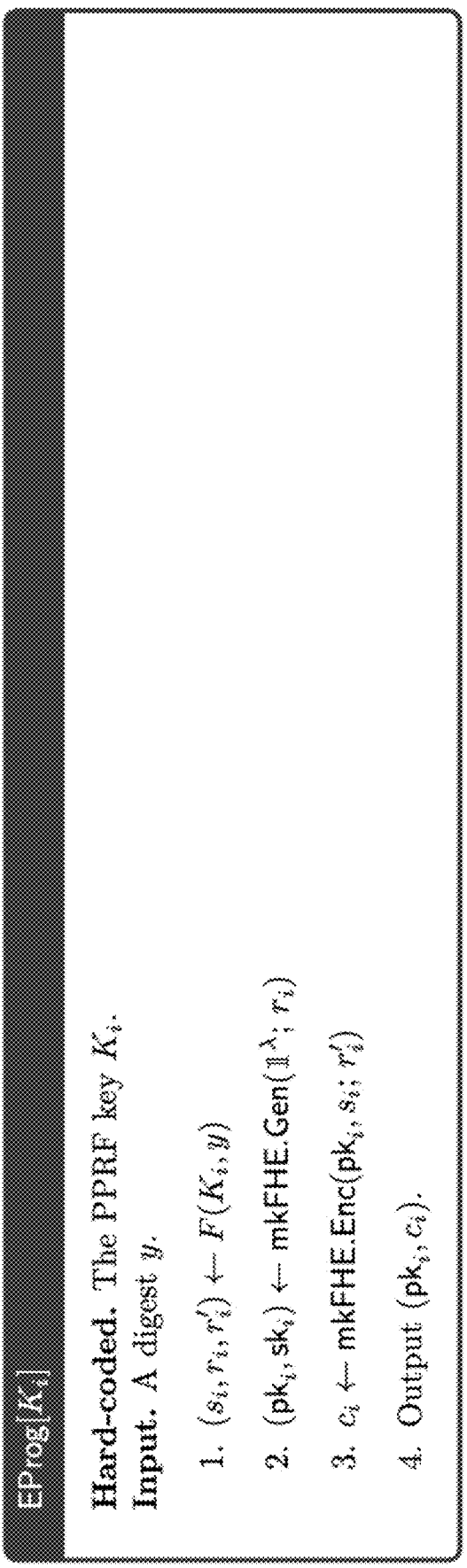
Figure 5: A sketch of the unobfuscated encryption program of party $P_i$.

DProg$[K_i, EP_i, \sigma, (\mathsf{id}_j)_{j \neq i}]$

Hard-coded. The PPRF key $K_i$, the encryption program $EP_i$, the CRS for a NIZK $\sigma$, the identities of the other parties $(\mathsf{id}_j)_{j \neq i}$.
Input. Set of $n-1$ tuples $(EP_j, \pi_j)_{j \neq i}$ where $EP_j$ is the encryption program of party $P_j$ and $\pi_j$ is a NIZK proving its well-formedness.

1. $\forall j \neq i$: $b_j \leftarrow \mathsf{NIZK.Verify}(\sigma, \mathsf{id}_j, \pi_j, EP_j)$
2. If $\exists j \neq i$ such that $b_j = 0$, output $\bot$.
3. $\forall j \in [n]$: $y_j \leftarrow \mathsf{Hash}((EP_l)_{l \neq j})$
4. $\forall j \in [n]$: $(\mathsf{pk}_j, c_j) \leftarrow EP_j(y_j)$
5. $C \leftarrow \mathsf{mkFHE.Eval}(D, c_1, \ldots, c_n)$
6. $(s_i, r_i, r'_i) \leftarrow F(K_i, y_i)$
7. $(\mathsf{pk}_i, \mathsf{sk}_i) \leftarrow \mathsf{mkFHE.Gen}(1^\lambda; r_i)$
8. $d_i \leftarrow \mathsf{mkFHE.PartDec}(C, \mathsf{sk}_i)$
9. Output $d_i$ Figure 6: A sketch of the unobfuscated decryption program of party $P_i$.

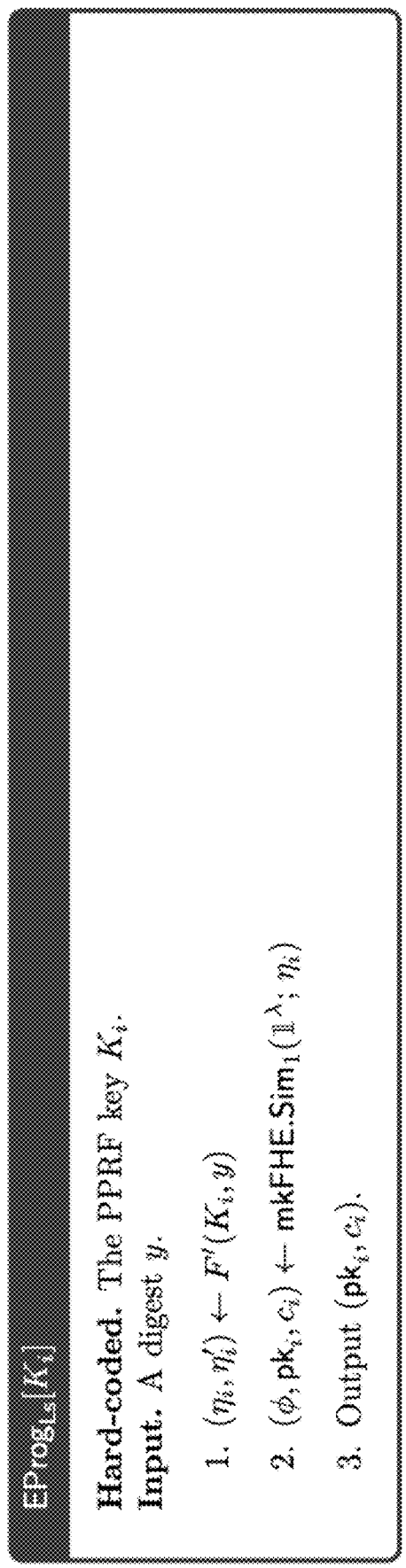
Figure 7: A sketch of the unobfuscated encryption program for the lossy mode $DProg_{Ls}[K_i, EP_i, \sigma, (\tau_e^i)_{j \neq i}, K, f]$

Hard-coded. The PPRF key $K_i$, the encryption program $EP_i$, the CRS for the almost everywhere extractable NIZK $\sigma$, the extraction trapdoors $(\tau_e^i)_{j \neq i}$, a PPRF key $K$, an ELF $f$.

Input. Set of $n-1$ tuples $(EP_j, \pi_j)_{j \neq i}$ where $EP_j$ is the encryption program of party $P_j$ and $\pi_j$ is an almost everywhere extractable NIZK proving its well-formedness.

1. $\forall j \neq i: \quad K_j \leftarrow \text{NIZK.Extract}(\tau_e^i, \pi_j, EP_j)$
2. If $\exists j \neq i$ such that $K_j = \perp$, output $\perp$
3. $\forall j \in [n]: \quad y_j \leftarrow \text{Hash}((EP_l)_{l \neq j})$
4. $\forall j \neq i: \quad (s_j, r_j, r'_j) \leftarrow F(K_j, y_j)$
5. $z \leftarrow f(EP_1, \ldots, EP_n)$
6. $s \leftarrow F(K, z)$
7. $R' \leftarrow D(1^\lambda; s)$
8. $(\eta_i, \eta'_i) \leftarrow F'(K_i, y_i)$
9. $(\phi, pk_i, c_i) \leftarrow \text{mkFHE.Sim}_1(1^\lambda; \eta_i)$
10. $d_i \leftarrow \text{mkFHE.Sim}_2(\phi, D, R', (s_j, r_j, r'_j)_{j \neq i}; \eta'_i)$
11. Output $d_i$ Figure 8: A sketch of the unobfuscated decryption program for the lossy mode

CCA-HIDING GAME

Initialisation: This procedure is run only once, at the beginning of the game.

1. $b \xleftarrow{\$} \{0,1\}$
2. Activate $\mathcal{A}$ with $1^\lambda$.
3. Receive a Turing machine $P$ from the adversary.
4. Run $P$ on no input for at most $t(2^{\lambda^c})$ steps. If $P$ does not terminate before that, provide $\mathcal{A}$ with $\bot$, otherwise, provide it with the first $s(\lambda)$ bits of the output.
5. Receive a tag $\widehat{\mathsf{id}}$ from the adversary.

Value: This procedure can be queried multiple times, both before and after choosing the challenge. Upon receiving pairs $(\mathsf{id}, c)$ where $\mathsf{id} \neq \widehat{\mathsf{id}}$, the challenger replies with $\mathsf{Val}(\mathsf{id}, c)$.

Challenge: This procedure can be queried only once. The adversary provides $m_0, m_1 \in \{0,1\}^{p(\lambda)}$. The challenger replies with $c \xleftarrow{\$} \mathsf{CCACom}(1^\lambda, \widehat{\mathsf{id}}, m_b)$.

Win: The adversary wins if it guesses $b$.

Figure 9: CCA-hiding game

THE IND-ID-CPA GAME

Initialisation: This procedure is run only once, at the beginning of the game.

1. $b \xleftarrow{\$} \{0,1\}$
2. $Q \leftarrow \emptyset$
3. $\widehat{\mathsf{id}} \leftarrow \perp$
4. $(\mathsf{mpk}, \mathsf{msk}) \xleftarrow{\$} \mathsf{Setup}(1^\lambda)$
5. Activate the adversary with $1^\lambda$ and $\mathsf{mpk}$.

Key: This procedure can be queried multiple times, both before and after choosing the challenge. On input identities $\mathsf{id} \in \{0,1\}^{q(\lambda)}$ such that $\mathsf{id} \neq \widehat{\mathsf{id}}$, the challenger adds $\mathsf{id}$ to $Q$ and replies with $\mathsf{Extract}(\mathsf{msk}, \mathsf{id})$.

Challenge: This procedure can be queried only once. The adversary provides $m_0, m_1 \in \{0,1\}^{p(\lambda)}$ and $\widehat{\mathsf{id}} \in \{0,1\}^{q(\lambda)} \setminus Q$. The challenger answers with $\mathsf{Enc}(\mathsf{mpk}, \widehat{\mathsf{id}}, m_b)$.

Win: The adversary wins if it guesses $b$.

Figure 10: The IND-ID-CPA game

THE MULTI-KEY FHE SECURITY GAME

Initialisation: This procedure is run only once, at the beginning.

1. $b \xleftarrow{\$} \{0,1\}$
2. Activate the adversary $\mathcal{A}$ with $1^\lambda$
3. Receive $H \subseteq [n]$ from the adversary along with $(x_i)_{i \in H}$.
4. $\forall i \in H : (\mathsf{pk}_i^0, \mathsf{sk}_i^0) \xleftarrow{\$} \mathsf{Gen}(1^\lambda; i)$
5. $\forall i \in H : c_i^0 \xleftarrow{\$} \mathsf{Enc}(\mathsf{pk}_i^0, x_i)$
6. $(\phi, (\mathsf{pk}_i^1, c_i^1)_{i \in H}) \xleftarrow{\$} \mathsf{Sim}_1(1^\lambda, H)$
7. $\forall i \in H : (\mathsf{pk}_i, c_i) \leftarrow (\mathsf{pk}_i^b, c_i^b)$
8. Provide $\mathcal{A}$ with $(\mathsf{pk}_i, c_i)_{i \in H}$.
9. Receive $(x_j, r_j, r'_j)_{j \notin H}$ from $\mathcal{A}$
10. $\forall j \notin H : (\mathsf{pk}_j, \mathsf{sk}_j) \leftarrow \mathsf{Gen}(1^\lambda, j; r_j)$
11. $\forall j \notin H : c_j \leftarrow \mathsf{Enc}(\mathsf{pk}_j, x_j; r'_j)$

Decryption: This procedure can be queried multiple times. On input a function $f$ with $n$ inputs, compute the following.

1. $C \leftarrow \mathsf{Eval}(f, \mathsf{pk}_1, \ldots, \mathsf{pk}_n, c_1, \ldots, c_n)$
2. $y \leftarrow f(x_1, \ldots, x_n)$
3. $\forall i \in H : d_i^0 \xleftarrow{\$} \mathsf{PartDec}(C, \mathsf{pk}_1, \ldots, \mathsf{pk}_n, i, \mathsf{sk}_i^0)$
4. $(\phi', (d_i^1)_{i \in H}) \xleftarrow{\$} \mathsf{Sim}_2(\phi, f, y, (x_j, r_j, r'_j)_{j \notin H})$
5. $\phi \leftarrow \phi'$
6. Provide $(d_i^b)_{i \in H}$ to $\mathcal{A}$

Win: The adversary wins if it guesses $b$.

Figure 11: The multi-key FHE security game diO Game for Almost Everywhere Extractable NIZKs

1. $b \xleftarrow{\$} \{0,1\}$
2. $(\sigma, \tau_s, \tau_e) \xleftarrow{\$} \mathsf{SimSetup}(1^\lambda)$
3. $(C, (\mathsf{id}_j)_{j \in [m]}, \psi) \xleftarrow{\$} \mathcal{A}_1(1^\lambda, \sigma, \tau_e)$
4. $\forall j \in [m]: \tau_e^j \xleftarrow{\$} \mathsf{Trap}(\tau_e, \mathsf{id}_j)$
5. $\widetilde{C}_0 \xleftarrow{\$} \mathsf{iO}(1^\lambda, C_0[\sigma, (\mathsf{id}_j)_{j \in [m]}])$ (see below)
6. $\widetilde{C}_1 \xleftarrow{\$} \mathsf{iO}(1^\lambda, C_1[\sigma, (\mathsf{id}_j)_{j \in [m]}, (\tau_e^j)_{j \in [m]}])$ (see below)
7. The adversary wins if $\mathcal{A}_2(\psi, \widetilde{C}_b) = b$.

---

$C_0[\sigma, (\mathsf{id}_j)_{j \in [m]}]$

Hard-coded. The NIZK CRS $\sigma$, the $m$ identities $(\mathsf{id}_j)_{j \in [m]}$.
Input. A set of inputs $(x_j)_{j \in [m]}$ and a set of proofs $(\pi_j)_{j \in [m]}$.

1. $\forall j \in [m]: b_j \leftarrow \mathsf{NIZK.Verify}(\sigma, \mathsf{id}_j, \pi_j, x_j)$
2. If $\exists j \in [m]$ such that $b_j = 0$, output $\bot$
3. Output $C(x_1, \ldots, x_m)$

---

$C_1[\sigma, (\mathsf{id}_j)_{j \in [m]}, (\tau_e^j)_{j \in [m]}]$

Hard-coded. The NIZK CRS $\sigma$, the $m$ identities $(\mathsf{id}_j)_{j \in [m]}$, the $m$ extraction trapdoors $(\tau_e^j)_{j \in [m]}$.
Input. A set of inputs $(x_j)_{j \in [m]}$ and a set of proofs $(\pi_j)_{j \in [m]}$.

1. $\forall j \in [m]: b_j \leftarrow \mathsf{NIZK.Verify}(\sigma, \mathsf{id}_j, \pi_j, x_j)$
2. $\forall j \in [m]: w_j \leftarrow \mathsf{NIZK.Extract}(\tau_e^j, \pi_j, x_j)$
3. If $\exists j \in [m]$ such that $b_j = 0$ or $w_j = \bot$, output $\bot$
4. Output $C(x_1, \ldots, x_m)$ Figure 12: diO game for almost everywhere extractable NIZKs

CHOSEN-ID ZERO-KNOWLEDGE GAME

Initialisation: This procedure is run only once, at the beginning of the game.

1. $b \xleftarrow{\$} \{0,1\}$
2. $Q_0, Q_1 \leftarrow \emptyset$
3. $(\sigma, \tau_s, \tau_e) \xleftarrow{\$} \mathsf{SimSetup}(1^\lambda)$
4. Activate the adversary with $1^\lambda$ and $\sigma$.

Trapdoor: This procedure can be queried multiple times and at any point of the game. Upon receiving any query (Trap, id) where id $\notin Q_1$, compute the following.

1. Add id to $Q_0$
2. $\tau_e^{id} \xleftarrow{\$} \mathsf{Trap}(\tau_e, \mathsf{id})$
3. Give $\tau_e^{id}$ to the adversary.

Prove: This procedure can be queried multiple times and at any point of the game. Upon receiving any query (Prove, id, $x$, $w$) where id $\notin Q_0$ and $(x, w) \in \mathcal{R}$, compute the following.

1. Add id to $Q_1$
2. $\pi^0 \xleftarrow{\$} \mathsf{Prove}(1^\lambda, \sigma, \mathsf{id}, x, w)$
3. $\pi^1 \xleftarrow{\$} \mathsf{SimProve}(\tau_s, \mathsf{id}, x)$
4. Give $\pi^b$ to the adversary.

Win: The adversary wins if it guesses $b$.

Figure 13: Chosen-ID zero-knowledge game

CHOSEN-ID ZERO-KNOWLEDGE, ALMOST EVERYWHERE EXTRACTABLE NIZK

Let $q_1(\lambda)$ denote the length of the randomness needed by IBE.Enc. Let $q_2(\lambda)$ denote the length of the randomness needed by Com.

Setup($1^\lambda$)

1. (mpk, msk) $\xleftarrow{\$}$ IBE.Setup($1^\lambda$)
2. $(v, w) \xleftarrow{\$}$ OWF.Gen($1^\lambda$)
3. Output $\sigma := (\text{mpk}, v)$ Prove($1^\lambda, \sigma = (\text{mpk}, v), \text{id}, x, w$)

1. $c_0 \xleftarrow{\$}$ Com($1^\lambda, 0$)
2. $r \xleftarrow{\$} \{0, 1\}^{q_1(\lambda)}$
3. $c_1 \leftarrow$ IBE.Enc(mpk, id, $w; r$)
4. $\pi' \xleftarrow{\$}$ NIWI.Prove($1^\lambda, (\text{mpk}, v, \text{id}, c_0, c_1, x), (w, r)$)
5. Output $\pi := (c_0, c_1, \pi')$ Verify($\sigma = (\text{mpk}, v), \text{id}, \pi = (c_0, c_1, \pi')$)

1. Output NIWI.Verify($\pi', (\text{mpk}, v, \text{id}, c_0, c_1, x)$)

Figure 14: A chosen-ID zero-knowledge, almost everywhere extractable NIZK

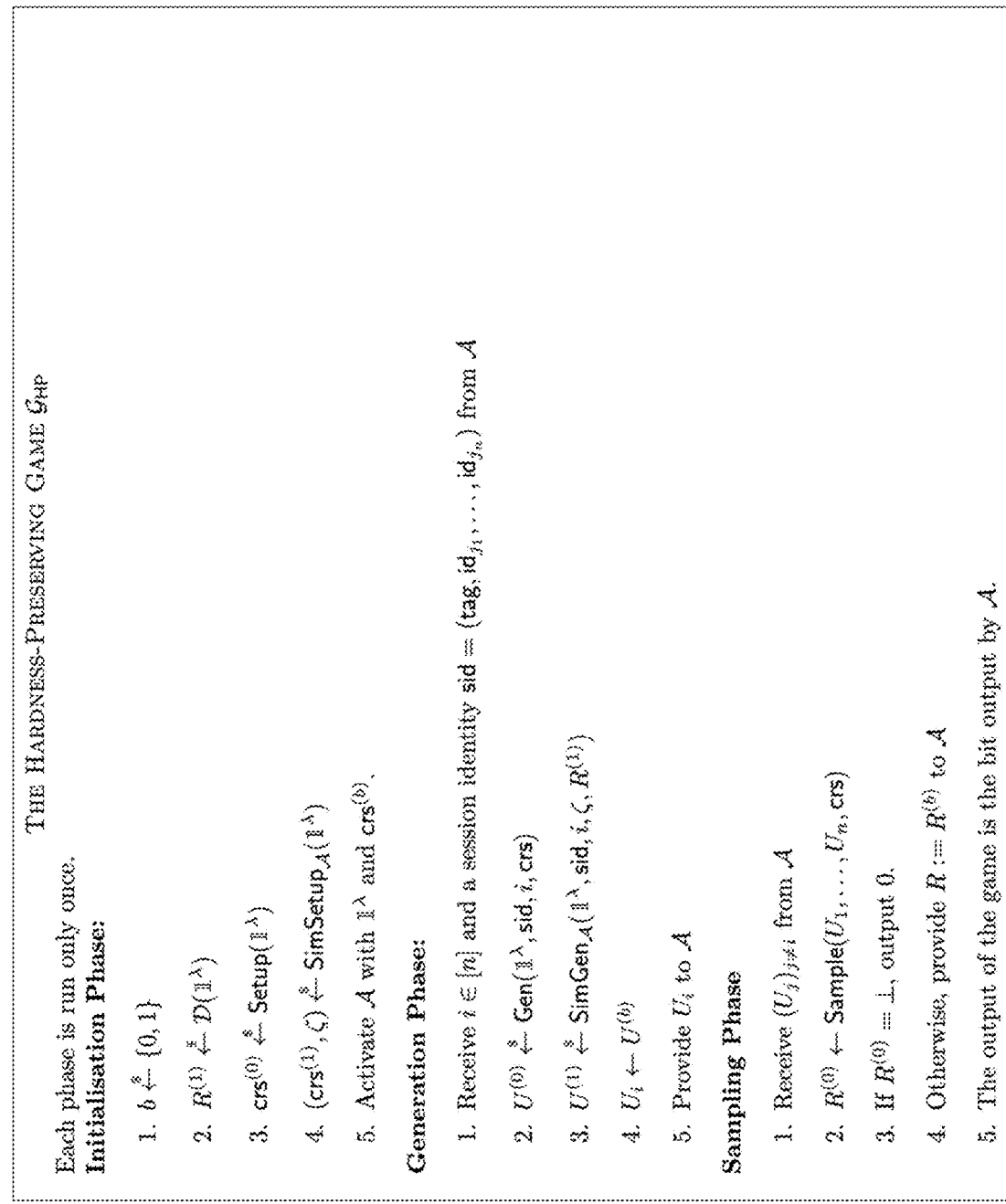
Figure 15: The hardness-preserving game $\mathcal{G}_{HP}$

OUR CONSTRUCTION OF DISTRIBUTED SAMPLERS

Setup($1^\lambda$):
1. $\sigma \xleftarrow{\$} \text{NIZK.Gen}(1^\lambda)$
2. $\sigma' \xleftarrow{\$} \text{NIZK'.Gen}(1^\lambda)$
3. Output crs $:= (\sigma, \sigma')$ Gen($1^\lambda$, sid, $i$, crs $:= (\sigma, \sigma')$):
1. $\rho_1 \xleftarrow{\$} \{0,1\}^{L_1(\lambda)}$
2. $\rho_2 \xleftarrow{\$} \{0,1\}^{L_2(\lambda)}$
3. $W \xleftarrow{\$} \{0,1\}^\lambda$
4. $(K_1^{(i)}, K_2^{(i)}, u_1, u_2) \leftarrow \text{PRG}(W)$
5. $\text{hk}_i \leftarrow \text{Hash.Gen}(1^\lambda, u_1)$
6. $\text{EP}_i \leftarrow \text{iO}(1^\lambda, \text{EProg}[K_1^{(i)}, K_2^{(i)}, i]; u_2)$ (see Fig. ??)
7. $\text{DP}_i \leftarrow \text{iO}(1^\lambda, \text{DProg}[i, \text{sid}, K_2^{(i)}, \text{EP}_i, \text{hk}_i, \sigma]; \rho_1)$ (see Fig. ??)
8. $\pi_i \leftarrow \text{NIZK.Prove}(\sigma, (\text{sid}, i), (i, \text{hk}_i, \text{EP}_i); \rho_2)$
9. $\pi'_i \leftarrow \text{NIZK'.Prove}(\sigma', (i, \text{sid}, \text{hk}_i, \text{EP}_i, \text{DP}_i, \pi_i, \sigma), (W, \rho_1, \rho_2))$
10. Output $U_i := (\text{hk}_i, \text{EP}_i, \text{DP}_i, \pi_i, \pi'_i)$.

Sample$\left((U_j := (\text{hk}_j, \text{EP}_j, \text{DP}_j, \pi_j, \pi'_j))_{j \in [n]}, \text{sid}, \text{crs} := (\sigma, \sigma')\right)$
1. $\forall j \in [n]: b_j \leftarrow \text{NIZK'.Verify}(\sigma', \pi'_j, (j, \text{sid}, \text{hk}_j, \text{EP}_j, \text{DP}_j, \pi_j, \sigma))$
2. If there exists $j \in [n]$ such that $b_j := 0$, output $\perp$.
3. $\forall j \in [n]: d_j \leftarrow \text{DP}_j((\text{hk}_i, \text{EP}_i, \pi_i)_{i \neq j})$
4. $R \leftarrow \text{mkFHE.FinDec}(d_1, \ldots, d_n)$
5. Output $R$ Figure 16: The standard mode of the lossy distributed sampler

SIMULATION ALMOST EVERYWHERE EXTRACTABLE U-NIZK GAME

Initialisation: This procedure is run only once, at the beginning of the game.

1. $(\sigma, \tau_s, \tau_e) \xleftarrow{\$} \mathsf{SimSetup}(1^\lambda)$
2. $Q \leftarrow \emptyset$
3. Activate $\mathcal{A}$ with $1^\lambda$, $1^{d(\lambda)}$, $\sigma$, $\tau_e$ and $\alpha_\lambda$.

Prove: This procedure can be queried multiple times. Upon receiving any query $(\mathsf{Prove}, \mathsf{id}, x)$, compute the following.

1. Add id to $Q$.
2. $\pi \xleftarrow{\$} \mathsf{SimProve}(\tau_s, \mathsf{id}, x)$
3. Provide $\pi$ to the adversary.

Win: The adversary wins if it outputs a pair $(\mathsf{id}, y)$ such that $\mathsf{id} \notin Q$ and $y \in \mathsf{VPFE}_{\sigma, \tau_e, \mathsf{id}}$.

Figure 17: Simulation almost everywhere extractable U-NIZK game dIO GAME FOR SIMULATION ALMOST EVERYWHERE EXTRACTABLE U-NIZKs

Initialisation: This procedure is run only once, at the beginning of the game.

1. $b \xleftarrow{\$} \{0,1\}$
2. $Q \leftarrow \emptyset$
3. $(\sigma, \tau_s, \tau_e) \xleftarrow{\$} \mathsf{SimSetup}(\mathbb{1}^\lambda)$
4. Activate the adversary $\mathcal{A}$ with $\mathbb{1}^\lambda$, $\sigma$, $\tau_e$ and $a_\lambda$.

Challenge: This query can be issued only once. On input a circuit $C$ and identities $(\mathsf{id}_j)_{j \in [m]}$ such that $\mathsf{id}_j \notin Q$ for every $j \in [m]$, perform the following.

1. $\forall j \in [m]:\ \tau_e^j \xleftarrow{\$} \mathsf{Trap}(\tau_e, \mathsf{id}_j)$
2. $\widetilde{C}_0 \xleftarrow{\$} \mathsf{iO}(\mathbb{1}^\lambda, C_0[\sigma, (\mathsf{id}_j)_{j \in [m]}, (\tau_e^j)_{j \in [m]}])$
3. $\widetilde{C}_1 \xleftarrow{\$} \mathsf{iO}(\mathbb{1}^\lambda, C_1[\sigma, (\mathsf{id}_j)_{j \in [m]}, (\tau_e^j)_{j \in [m]}])$
4. Provide the adversary with $\widetilde{C}_b$.

Prove: This procedure can be queried multiple times, both before and after choosing the challenge. On input any query $(\mathsf{Prove}, \mathsf{id}, x)$ where $\mathsf{id} \neq \mathsf{id}_j$ for every $j \in [m]$, provide the adversary with $\mathsf{SimProve}(\tau_s, \mathsf{id}, x)$ and add $\mathsf{id}$ to $Q$.

Win: The adversary wins if it guesses $b$.

Figure 18: dIO game for simulation almost everywhere extractable U-NIZKs

A SIMULATION ALMOST EVERYWHERE EXTRACTABLE U-NIZK WITHOUT CRS

Prove($1^\lambda$, id, $x$, $w$)
1. $r \xleftarrow{\$} \{0,1\}^{q(\lambda)}$
2. $c_0 \xleftarrow{\$} \text{Com}(1^\lambda, 0)$
3. $c_1 \leftarrow \text{ExCom}(1^\lambda, w; r)$
4. $\pi' \xleftarrow{\$} \text{NIWI.Prove}(1^\lambda, (\text{id}, c_0, c_1, x), (w, r))$
5. Output $\pi := (c_0, c_1, \pi')$ Verify(id, $\pi = (c_0, c_1, \pi')$, $x$)
1. $b \leftarrow \text{NIWI.Verify}(\pi', (\text{id}, c_0, c_1, x))$
2. Output $b$.

SimSetup($1^\lambda$)
1. Get the trapdoor $\tau_s$ for CLOWF and the extraction trapdoor $\tau_e$ for ExCom.
2. Output the empty string along with $\tau_s$ and $\tau_e$.

SimProve($\tau_s$, id, $x$)
1. $r \xleftarrow{\$} \{0,1\}^{q(\lambda)}$
2. $u^{id} \leftarrow \text{Derive}(\tau_s, \text{id})$
3. $c_0 \leftarrow \text{Com}(1^\lambda, u^{id}; r)$
4. $c_1 \xleftarrow{\$} \text{ExCom}(1^\lambda, 0)$
5. $\pi' \xleftarrow{\$} \text{NIWI.Prove}(1^\lambda, (\text{id}, c_0, c_1, x), (u^{id}, r))$
6. Output $\pi := (c_0, c_1, \pi')$ Trap($\tau_e$, id)
1. Output $\tau_e^{id} = (\tau_e, \text{id})$ Extract($\tau_e^{id} = (\tau_e, \text{id})$, $\pi = (c_0, c_1, \pi')$, $x$)
1. $b \leftarrow \text{Verify}(1^\lambda, \text{id}, \pi, x)$
2. If $b = 0$, output $\bot$.
3. $w \leftarrow \text{ExCom.Extract}(\tau_e, c_1)$
4. If $(x, w) \in \mathcal{R}$, output $w$, otherwise, output $\bot$.

Figure 19: A simulation almost everywhere extractable U-NIZK without CRS

Fig. 19

SECURE DISTRIBUTED SAMPLERS FOR CRYPTOGRAPHIC REFERENCE STRINGS

CROSS-REFERENCE TO RELATED APPLICATION

This application claims the benefit of U.S. Provisional Application Ser. No. 63/499,260 filed May 1, 2023, the content of which is incorporated by reference herein in its entirety.

FIELD OF THE INVENTION

The present disclosure generally relates to the field of distributed samplers for common reference strings, in particular samplers with security guarantees in the standard model.

BACKGROUND OF THE INVENTION

Many protocols require a common reference string to be generated by a third party in order to securely run the protocol. Importantly, the security of the protocol requires that the any secrets revealed during setup are hidden from the parties of the protocol. For example, if the protocol relies on a public RSA modulus for a reference string, the parties of the protocol must not know the prime factors. Such a structured common reference string requires placing enormous trust in the third party, and naturally leads to the question of what happens if the trusted third party is actually not trustworthy.

Digging deeper, there may be many potential third parties who are willing to run the setup: maybe certain state organizations (e.g. NIST) as well and independent organizations (e.g. EFF). Some participants in the protocol may trust some third parties, while some participants only trust other third parties, and there may be no overlap between the trusted parties. The question then arises as to how can we ensure that all protocol participants trust the reference string.

An obvious solution is for all potential third parties to run an MPC protocol to generate the reference string. Then, as long as each participant trusts a single third party, they will trust the reference string (CRS). However, engaging in an MPC protocol can be a logistical burden for these third parties. For comparison, in a situation where the CRS is generated by a single trusted third party, that party can simply post the reference string they produce to some public domain. In contrast, if many third parties are engaging in an MPC protocol to compute the reference string, this requires the many third parties to send several messages back-and-forth between each other.

Another issue is the difficulty of updating the CRS if we want to expand the number of involved trusted parties. For example, suppose third parties A, B, C engaged in an MPC protocol to generate a CRS such as an RSA modulus N. At some later date, users u, v wish to engage in a protocol using an RSA modulus, but user u only trusts a new third party D and not A, B, C. Meanwhile v does not trust D since it is new. Unfortunately, this would require A, B, C to come back online and interact with D to create a new modulus N'. A, B, C may be unable or unwilling to do so, as it would be an unreasonable burden to re-run the MPC any time a trusted setup was requested with a new third party.

Solution: Distributed Samplers. Abram, Scholl, and Yakoubov proposed the notion of a distributed sampler. Here, parties A, B, C each individually run their own setup algorithm locally, arriving at messages $U_A$, $U_B$, $U_C$, which they post to some public domain. Now when a set of users want a CRS generated by A, B, C, they look up $U_A$, $U_B$, $U_C$, and run a procedure which deterministically extracts a CRS from $U_A$, $U_B$, $U_C$. Because the process of computing the CRS from $U_A$, $U_B$, $U_C$ is deterministic, all parties can compute it from $U_A$, $U_B$, $U_C$ for themselves, and therefore do not require any additional interaction. Thus, the tuple $U_A$, $U_B$, $U_C$ now acts as the common reference string, which is simply the concatenation of the individual messages of the various third parties. Informally, as long as a user trusts at least one of the third parties, then they trust the CRS derived from the list of strings that includes that party.

When a set of users wishes to incorporate a new third party D, all they need is for D to generate and post its own $U_D$. Now the parties can derive a new CRS from $U_A$, $U_B$, $U_C$, $U_D$. Importantly the original parties A, B, C do not need to do anything to add a new third party. In the follow-up work of Abram, Obremski, and Scholl, a construction that maintains security in such a scenario.

Limitations of Existing Work. The work of Abram et al. constructs two kinds of distributed samplers both utilizing indistinguishability obfuscation. The first achieves semi-honest security, where the third parties honestly generate their messages but wish to then break a protocol using the generated CRS. Unfortunately, this notion of security is rather limited, since a truly malicious adversary could try to generate their messages dishonestly in order to influence the generated CRS. Such influence over the CRS offers much greater flexibility in breaking the protocol. For example, if the CRS is for a statistically sound proof system, a malicious adversary may try to influence the CRS into a "bad" one where false proofs exist.

The second distributed sampler achieves full malicious security in the UC model. However, the construction requires the random oracle model, and worse requires the full power of programming the random oracle.

Thus, the existing work either requires the full power of the random oracle model, or achieves only a very limited notion of security. This is no accident: as shown by Abram et al., full standard model malicious security is in fact impossible. The question then arises as to what kind of malicious security can be meaningfully achieved in the standard model.

BRIEF SUMMARY OF THE INVENTION

Previous work constructs distributed samplers in the random oracle model, or in the standard model with very limited security guarantees. This is no accident, as standard model distributed samplers with full security were shown impossible.

In this work, we provide new definitions for distributed samplers which we show achieve meaningful security guarantees in the standard model. In particular, our notion implies that the hardness of a wide range of security games is preserved when the CRS is replaced with a distributed sampler. We also show how to realize our notion of distributed samplers. A core technical tool enabling our construction is a new notion of single-message zero knowledge.

The above limitations of prior work are addressed herein, by giving new definitions for distributed samplers that avoid the above impossibility while still guaranteeing meaningful security against malicious adversaries, and providing a new instantiation of distributed samplers satisfying this definition. As a crucial step toward this goal, we also investigate single message zero knowledge proofs in the standard model, and provide new constructions with novel features.

Defining Distributed Samplers. Our first contribution is to define new security notions for distributed samplers. We describe a notion of security preserving distributed samplers, which implies that, for any game-based protocol using a reference string, security is preserved by the distributed sampler. That is, if the protocol is secure under a reference string generated by a single trusted third party, then it is also secure when the reference string is generated via a distributed sampler, as long as at least one of the parties involved is trusted. We also give some technical definitions of security for distributed samplers that are easier to reason about, and we show that these notions imply adequate notions of security preservation.

Constructing Distributed Samplers. Next, we show how to construct distributed samplers meeting our new definition. We face the following challenge: in order to justify that the reference string is "as good as" an honestly generated one, the reduction needs to be able to embed an actual honestly generated reference string N into the honest third party's message, and somehow force the adversary to generate their own messages in a way that makes the derived reference string equal to N. But in the case of malicious adversaries, whatever strategy the reduction uses, the adversary can seemingly use as well to force the derived reference string to be their own, maliciously generated, N'.

Extractable 1-message zero knowledge. Resolving the above problem requires many tools. One of the main ones is a new 1-message zero knowledge proof, which does not need a CRS. Now, such an object is normally considered impossible, but it can be possible if the simulator is allowed to be non-uniform while the adversary is required to be uniform. Such 1-message zero knowledge leveraging non-uniformity was considered before Barak and Pass. However, our use of zero knowledge requires several features, such as the ability for the reduction to extract the original proof from the sender's message, that were not present in existing 1-message zero knowledge. We therefore develop a new 1-message zero knowledge proof system with several useful features that we crucially leverage to achieve our notion of distributed samplers.

BRIEF DESCRIPTION OF THE DRAWINGS

Non-limiting and non-exhaustive examples are described with reference to the following figures.

FIG. 1 illustrates an example informal explanation of malicious security for distributed samplers.

FIG. 2 illustrates an example informal explanation of hardness-preserving security for distributed samplers.

FIG. 3 illustrates example search games and their compilations.

FIG. 4 illustrates an informal explanation of indistinguishability-preserving security for distributed samplers.

FIG. 5 illustrates an example sketch of the unobfuscated encryption program of party $P_i$.

FIG. 6 illustrates an example sketch of the unobfuscated decryption program of party $P_i$.

FIG. 7 illustrates an example sketch of the unobfuscated encryption program for the lossy mode.

FIG. 8 illustrates an example sketch of the unobfuscated decryption program for the lossy mode.

FIG. 9 illustrates an example CCA-hiding game.

FIG. 10 illustrates an example IND-ID-CPA game.

FIG. 11 illustrates an example multi-key FHE security game.

FIG. 12 illustrates an example diO game for almost everywhere extractable NIZKs.

FIG. 13 illustrates an example chosen-ID zero-knowledge game.

FIG. 14 illustrates an example chosen-ID zero-knowledge, almost everywhere extractable NIZK.

FIG. 15 illustrates an example of the hardness-preserving game $\mathcal{G}_{HP}$.

FIG. 16 illustrates and example of the standard mode of the lossy distributed sampler.

FIG. 17 illustrates an example simulation almost everywhere extractable U-NIZK game.

FIG. 18 illustrates an example diO game for simulation almost everywhere extractable U-NIZKs.

FIG. 19 illustrates an example of a simulation almost everywhere extractable U-NIZK without CRS.

DETAILED DESCRIPTION

Figure 20:
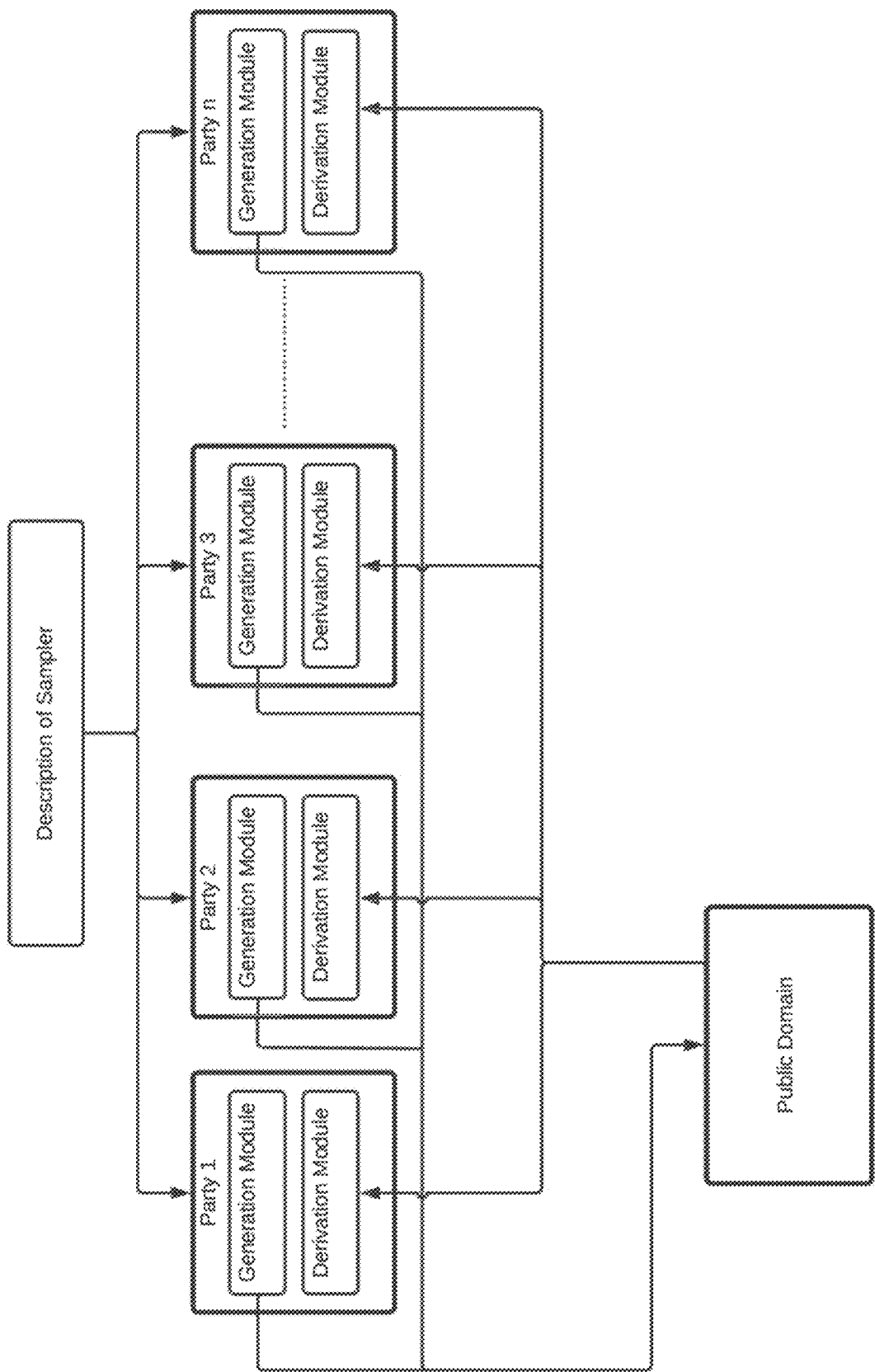
FIG. 20 illustrates a system for generating a common reference string for multiple parties, according to aspects of the present disclosure.

The following description sets forth exemplary aspects of the present disclosure. It should be recognized, however, that such description is not intended as a limitation on the scope of the present disclosure. Rather, the description also encompasses combinations and modifications to those exemplary aspects described herein.

1 Technical Implementation 1.1 New Notions of Distributed Sampler

Full malicious security, and its impossibility. We first recall an informal description of the notion of malicious security obtained by Abram, Scholl, and Yakoubov, which follows the real/ideal paradigm as shown in FIG. 1. In the real world, the adversary is given the messages of the honest third parties, and then subsequently generates the messages of the malicious third parties. The challenger then derives the CRS from the combined messages of third parties, and gives it to the adversary. In the ideal world, the honest third party message is instead generated by a simulator (which depends on the adversary), and the simulator is given as input an honestly generated CRS. The adversary is then given the simulated message and the honestly generated CRS. Security dictates that the two worlds are indistinguishable, which in particular implies that the derived CRS is equal to the provided honest CRS in the ideal world.

FIG. 1 illustrates an example informal explanation of malicious security for distributed samplers. Here, Gen is the algorithm for honestly generating the third party messages $U_j$ and Sample is the algorithm that combines the messages into the derived CRS R. i is the honest user, t is the simulator's choice of which of the honest CRS samples $R_1, \ldots, R_q$ to use.

This brief description is obvious impossible, however. Indeed, a malicious adversary could be rushing: after seeing the honest party's message, it could generate several sets of malicious third party messages (but even generate them honestly), compute the derived CRSs, and then select the set of third party messages that give a CRS most advantageous to the adversary. This means it is impossible for the simulator to guarantee that any single provided honest CRS is used by the adversary. Thus, the definition actually gives the simulator a polynomial number of honestly generated potential CRSs, and the simulator can then choose which one gets sent to the adversary.

The above described notion of security is still impossible, as shown by Abram, Obremski, and Scholl. One basic reason is the following: the simulator has to produce a message $U_i$, whose length is fixed by the protocol. However, the sequence of CRSs can be arbitrary long, since an arbitrary polynomial-time adversary can generate arbitrarily many sets of third party messages, thereby allowing them to select from an arbitrary polynomial number of CRSs. This means there is no way for a single $U_i$ to embed all of the CRSs. Abram et al. formalize an impossibility, and it seems rather robust, since although their results apply only to the UC model with dishonest majority, different security settings such as standalone security, superpolynomial simulation, honest majority, or having the protocol depend itself on a CRS do not seem to solve the problem. The positive results of Abram et al. therefore employ a random oracle. This avoids the impossibility, since the simulator can now program the random oracle with the various CRSs, instead of programming them into $U_i$. However, it requires the full power of programming the random oracle, and it is unclear what kind of security this gives in the standard model.

Our first notion: hardness-preserving distributed samplers. We now describe our new notions of security for distributed samplers. The first we describe is that of hardness preserving, which is given informally in FIG. 2. There are two main differences from the security notion described. First, only a single honest CRS is given to the simulator in the ideal world. This is necessary in the standard model, as there is no way to program an unbounded number of CRSs into a fixed length simulated message. Note that with this change we can no longer hope to force the derived CRS to be equal to the provided honest CRS, except possibly with inverse polynomial probability. This means an adversary can distinguish real from ideal in the majority of cases. So the second change is to relax indistinguishability to the following. We only require that if the adversary outputs 1 in the real world with non-negligible probability $\epsilon_1$, then it also outputs 1 in the ideal world with non-negligible probability $\epsilon_2$. But $\epsilon_1$ and $\epsilon_2$ do not need to be close, and $\epsilon_2$ can be far lower than $\epsilon_1$.

FIG. 2 illustrates an example informal explanation of hardness-preserving security for distributed samplers. It is the same as FIG. 1, except that there is only a single honest CRS in the ideal world, and the relation between success probabilities in the two worlds is relaxed.

The question is then what kind of guarantees does such a relaxed definition provide. We show that hardness preserving distributed samplers are good for guaranteeing security for various search tasks. These are tasks where the adversary's goal is to output some value with non-negligible probability (as opposed to distinguishing tasks, where the goal is to output a value with probability non-negligibly larger than ½).

More precisely, we consider a general search game between a challenger and adversary, where at some step the challenger is provided with an honestly generated CRS, which it uses in its own internal logic but also sends to the adversary. We can compile such a game into one where the CRS is generated via distributed samplers, and the adversary controls all but one of the trusted third parties. A diagram of such a game and its compilation is given in FIG. 3.

FIG. 3 illustrates example search games and their compilations. The figure on the left is a search game utilizing an honest CRS, while the figure on the right is the compiled game using a distributed sampler to generate the CRS.

Theorem 1 (Informal). If a Distributed Sampler is Hardness-Preserving and the Search Game is Hard, then the Compiled Search Game is Also Hard Our second notion: indistinguishability-preserving distributed samplers. Hardness-preserving distributed samplers achieve a somewhat limited form of security against active adversaries. For starters, if the game is an indistinguishability game, the notion gives no guarantees. But a more subtle issue is the following. Consider a protocol like a NIZK with CRS. The definition of zero knowledge says that there exists a simulator which simulates both the CRS and the proof. Perhaps it generates the CRS such that it knows a certain trapdoor, which allows it to generate a proof without knowing a witness. When using a distributed sampler, we would like the ideal world to reflect this simulated CRS and proof. But this is not a simple matter of plugging in the existing simulated CRS into the simulator for the distributed sampler, as there is no way for the distributed sampler simulator to then use the CRS trapdoor to help generate the proof. In the language of protocols and functionalities, this means that for a protocol $\Pi$ with CRS which implements a functionality $\mathcal{F}$, , the compiled protocol $\Pi'$ using the distributed sampler to generate the CRS might no longer implement $\mathcal{F}$, .

The second distributed sampler notion we introduce, called indistinguishability-preserving, tries to tackle this problem. The concept is informally described in FIG. 4: a distributed sampler is indistinguishability-preserving if it compiles any protocol $\Pi$ with CRS satisfying the condition at the top of FIG. 4 for some functionality $\mathcal{F}$, and simulator $Sim_\Pi$, into a protocol without CRS satisfying the property at the bottom.

FIG. 4 illustrates an example informal explanation of indistinguishability-preserving security for distributed samplers.

We focus for a moment on the property at the top of FIG. 4. The condition states that the protocol $\Pi$ implements the functionality $\mathcal{F}$, . However, it actually gives a strictly stronger requirement: in the ideal world, the CRS is simulated using a distribution $\mathcal{D}'$ ' that produces both a sample R and a trapdoor $T$. . While the adversary receives only $R$ , the simulator $Sim_\Pi$ receives also T. In the NIZK example, $\mathcal{D}'$ would be the trapdoored CRS, and T is the trapdoor. An important point is that the simulated CRS is independent of any information known to the functionality (such as the statement being proved). Not all protocols have this kind of simulation.

Moving on to the bottom of FIG. 4, we observe that, in the ideal world, the sampling algorithm of the distributed sampler has been substituted with a new algorithm called Trapdoor. The latter has the purpose of extracting the trapdoors from the outputs of the simulated distributed sampler. The resulting values are then given to $Sim_\Pi$. Observe that the property at the bottom implies that the compiled protocol implements $\mathcal{F}$, .

Theorem 2 (Informal). If a Distributed Sampler is Indistinguishability-Preserving and the Protocol $\Pi$ Implements the Functionality $\mathcal{F}$, as in the Top of FIG. 4, then the Compiled Protocol Also Implements $\mathcal{F}$, The definition of indistinguishability-preserving distributed sampler is actually more general than what we outlined here: it provides security guarantees even when the sample from $\mathcal{D}$ is not given as a CRS but as an "oracle sample" revealed halfway through the execution of the protocol. It is still possible to compile this kind of protocol using a distributed sampler: instead of executing it at the beginning, the parties will run it at a later stage. Sometimes, when the first round of the protocol Π is independent of the CRS, this fact allows us to compile Π without adding rounds of interaction.

Lossy distributed samplers. In the paper, we introduce one last notion: lossy distributed samplers. This will be a convenient technical notion that will help us realize our notions of distributed samplers from above. Such a lossy sampler consists of two modes of operation: in addition to a standard mode, in which the output remains unpredictable as long as one party is honest, there exists a lossy mode. When the latter is activated, the output becomes predictable: with overwhelming probability, it will lie in a set of polynomial size determined by the messages of the honest parties. Distinguishing between standard and lossy mode will always be possible, however, for any given PPT adversary. But by choosing sufficiently large parameters for the lossy mode, we ask that the distinguishability advantage for any given adversary can be made an arbitrarily small non-negligible function, i.e. for every PPT A and δ=1/poly, there exists a sufficiently large q such that $$Pr[\mathcal{A} \to 1 | \text{StandardMode}] - Pr[\mathcal{A} \to 1 | \text{LossyMode}(g)] | \leq \delta$$

where q is a polynomial that upper bounds the size of the output space.

From lossy to hardness-preserving distributed samplers. We use lossy distributed samplers to build hardness-preserving distributed samplers. Consider an adversary $\mathcal{A}$ that, in the real-world game of the hardness-preserving distributed samplers (see FIG. 2), interacts with the standard mode of the construction. The idea is that if the adversary outputs 1 with non-negligible probability, we can activate the lossy mode with sufficiently large parameters so that $\mathcal{A}$ keeps outputting 1 with non-negligible probability. The main difference is that, now, the output of the construction is all of a sudden predictable.

At this point, we make use of a property that is satisfied by some lossy distributed samplers: programmability. The latter guarantees that we can hide an ideal sample $\hat{R} \xleftarrow{\$} \mathcal{D}$ among the outputs of a lossy-mode distributed samplers without the adversary's realizing. Since the output space is polynomial in size, the adversary ends up obliviously selecting $\hat{R}$ as output of the protocol with p=1/poly probability. Conditioned on this event, $\mathcal{A}$ still outputs 1 with non-negligible probability ϵ. In conclusion, in the ideal world, the challenger just needs to send lossy-mode messages. The adversary will output 1 with probability at least p·ϵ.

Theorem 3 (Informal). Any Programmable, Lossy Distributed Sampler is Hardness-Preserving 1.2 Building Lossy Distributed Samplers We explain how to build programmable, lossy distributed samplers using, among other tools, indistinguishability obfuscation, multi-key FHE, extremely lossy functions (ELFs) and a new primitive called almost everywhere extractable NIZKs. We make extensive use of subexponentially secure primitives. The resulting lossy distributed sampler makes use of a short (polynomial in λ, but independent of $\mathcal{D}$), reusable and unstructured CRS.

Our construction originates from the semi-honest distributed sampler of Abram, Scholl, and Yakoubov. We briefly recall it.

The encryption program. In Abram et al., a distributed sampler message consists of two obfuscated programs. Adapting the terminology to this paper, we call them the encryption program and the decryption program.

The encryption program of party $P_i$ takes care of generating a multi-key FHE encryption of a random string $s_i$ under a fresh key $pk_i$. The output of the construction will be obtained by adding the n random strings $s_i, \ldots, s_n$ and feeding the result as randomness for $\mathcal{D}$, i.e. the output sample is $R := \mathcal{D}(\mathbb{1}^n; s_1 \oplus \ldots \oplus s_n)$. Observe that thanks to the homomorphic properties of multi-key FHE, given the encryptions of the random strings, everybody is able to derive an encryption of $R$. (The fact that the ciphertexts are encrypted under different keys does not constitute a problem.) The issue is that nobody is able to decrypt it: the output of the multi-key FHE evaluation is encrypted under a "joint key". In order to decrypt, the parties usually need to collaborate: each of them performs a partial decryption of the joint ciphertext and publishes the result. By pooling together the partial plaintexts, everybody can reconstruct the hidden message.

The decryption program. Usually, a multi-key FHE decryption requires interaction. In the distributed samplers of Abram et al., however, the decryption program takes care of everything without needing additional rounds of interaction.

Formally, the decryption program of party $P_i$ takes as input the encryption programs of all the parties and evaluates them. After receiving the encryption of $s_j$ for every $j \in [n]$, the program retrieves an encryption of the output R by applying homomorphic operations on the ciphertexts. Observe that all the decryption programs derive the same joint ciphertext C. The execution terminates by performing a partial decryption of C using the private counterpart of $pk_i$. The program outputs the resulting partial plaintext.

Observe that by evaluating all the decryption programs, the parties are able to retrieve all the partial decryptions of C. At that point, reconstructing R is immediate.

Counteracting the residual function attack. A common issue of all 1-round MPC protocols is that an adversary can rerun the protocol in its head many times changing a subset of the messages. The outputs of all these executions are correlated with the inputs of the honest parties. For particular functionalities, this could leak enough information to reconstruct the input of the honest parties.

In distributed samplers, there are no private inputs but we still need to be careful: we need to make sure that, in every distributed sampler execution, the encryption programs use independent looking random strings $s_1, \ldots, s_n$. If that was not the case, the adversary might use the residual function attack to learn information about the randomness used in the main execution of the protocol.

In Abram et al., the authors ensure this by feeding the encryption program of each party with the hash of the encryption programs of the other players (notice that inputting the program themselves would not be possible for a matter of sizes). The encryption program generates the randomness for the multi-key FHE key $pk_i$ and the string $s_i$ by inputting the hash into a puncturable PRF. Observe that if any adversary reruns the distributed sampler in its head modifying any of the other messages, the hash fed in the encryption program changes. As a consequence, the program will use an independent looking $s_i$ (and an independent looking multi-key FHE key pair).

In our lossy distributed sampler, the encryption program will remain the same as in Abram et al. We sketch its code in FIG. 5.

FIG. 5 illustrates an example sketch of the unobfuscated encryption program of party $P_i$ Adding extractable NIZKs. The main change we bring to the construction is to add non-interactive zero knowledge (NIZK) proofs of the well-formedness of the encryption programs. These proofs will be inputted into the decryption programs. When any of the proofs do not verify, the decryption program will output $\bot$. We sketch their code in FIG. 6.

FIG. 6 illustrates an example sketch of the unobfuscated decryption program of party $P_i$ In order to describe the lossy mode of the distributed sampler, we assume that the NIZK is extractable, which means there is a special trapdoor that allows for extracting from any proof the witness used to generate the proof. We defer the discussion of the exact properties needed until later in this overview.

The lossy mode of the distributed sampler tweaks the programs of one of the honest parties as follows. The encryption program will generate simulated public keys and ciphertexts. The decryption program, instead of verifying the NIZKs, will extract the witnesses from them using the extraction property of the NIZK. From the latter, it will derive the randomness used to generate the multi-keys FHE keys and ciphertexts of the other players. At that point, it simulates the partial decryption instead of directly performing it. We recall that the simulator for the partial decryption takes as input a targeted plaintext $R'_*$. Such value might differ for the actual message hidden in the joint ciphertext C, however, the output of the decryption is still guaranteed to be $R'_*$.

FIG. 7 illustrates an example sketch of the unobfuscated encryption program for the lossy mode Decreasing the size of the output space using an ELF. In the lossy mode, the output of the protocol is decided by the party that sends the special programs (those that simulate the multi-key FHE operations). The question is then how can we restrict the output space to a set of polynomial size without the adversary's immediate detecting the small output space. After all, the adversary could keep generating outputs, hoping to find a collision. After only a polynomial number of outputs, the adversary would expect to find such a collision in the lossy mode.

To rectify this issue, we have the size of the lossy output space be a polynomial that grows with the adversary's run time and success probability, making sure it is a sufficiently large polynomial that the adversary cannot detect it in the time give.

At a lower level, we use extremely lossy functions (ELFs). These are randomized algorithms generating deterministic functions with large domain. The primitive has two modes of operations: injective mode and lossy mode. When the first mode is activated, the function is injective. In the other case, the image of the function has size smaller than q, where q is a polynomial parameterizing the lossy mode. The two modes will be always distinguishable with non-negligible advantage. ELFs guarantee that, for any adversary $\mathcal{A}$ and inverse-polynomial $\delta$, by choosing a sufficiently large polynomial q, it is possible to make the distinguishability advantage between the injective mode and the lossy mode smaller than $\delta$.

In our construction, we generate the value R' input in the partial decryption simulator by applying an ELF on the concatenation of the encryption programs of the n parties. The result is then fed in a puncturable PRF. Its output is used as randomness for $\mathcal{D}(\mathbb{1}^{\lambda \lambda})$. In this way, when the ELF has a small image, the distributed sampler will have a small output space. We sketch the code of the special programs in FIG. 7 and FIG. 8.

FIG. 8 illustrates an example sketch of the unobfuscated decryption program for the lossy mode Programmability. It is easy to see that our candidate distributed sampler is programmable: in order to hide an ideal sample $\hat{R}$ in the output space, we can just pick a random value $\hat{z}$ in the image of the ELF $f$ and input $\hat{R}$ into the partial decryption simulator whenever $f(EP_1, \ldots, EP_n) = \hat{z}$. By the security of puncturable PRFs, the changes cannot be detected by the adversary. Furthermore, if the ELF satisfies an additional property called regularity, it is guaranteed that the event $f(EP_1, \ldots, EP_n) = \hat{z}$ occurs with inverse-polynomial probability.

1.3 Security Proof Challenge 1: Simultaneous Extraction and Statistical Soundness At this point, we can try to prove the security of the candidate lossy distributed sampler. However, there are some challenges that need to be overcome.

The first challenge is the following. In the lossy mode, we need to be able to extract witnesses from valid proofs. However, zero knowledge implies that there are false proofs that contain no witnesses. The existence of these false proofs presents a problem for proving security using indistinguishability obfuscation.

More generally, consider the following general setup. There is a program $C_0$ receiving n values $x_1, \ldots, x_n$ as inputs from n parties along with n NIZKs proving their validity. The program $C_0$ outputs $\bot$ whenever any of the NIZKs does not verify. In the other cases, it outputs $C(x_1, \ldots, x_n)$ where C is some circuit. There also a second program $C_1$ that, instead of verifying the NIZKs, it tries to extract the witnesses hidden in them ($C_1$ outputs $\bot$ if the extraction of any witness fails). Then it uses the extracted witnesses to attempt to simulate the same behavior as $C_0$. The goal is to have obfuscations of $C_0$ and $C_1$ be indistinguishable.

The problem of differing inputs. The main issue is that $C_0$ and $C_1$ have differing inputs: the zero-knowledge property of the NIZKs guarantees the existence of proofs for which the witness cannot be extracted despite verification succeeds. On these inputs, the behavior of $C_0$ and $C_1$ can be easily told apart. In order to apply indistinguishability obfuscation, however, we need $C_0$ and $C_1$ to be equivalent programs.

Fortunately, finding these differing inputs is hard. Therefore the natural tool to achieve indistinguishability between obfuscations of $C_0$ and $C_1$ would be differing-input obfuscation. The existence of such primitive is, however, controversial due to some results suggesting its impossibility. Halevi et al. faced a problem similar to ours. They solved it by designing NIZKs that can be simulated only for statements hidden in the CRS. Since there is a small number of problematic statements, it is easy to take care of the corresponding executions of $C_0$ and $C_1$ using just indistinguishability obfuscation. The solution of Halevi et al., however, compromises the reusability of the CRS and makes it grow with the size of the statements. Since we want to keep the CRS as simple as possible, we follow a different approach.

Indistinguishability obfuscation is enough. We rely solely on indistinguishability obfuscation. Boyle, Chung and Pass showed that, if two programs have a polynomial number of differing inputs and finding any of them is hard, then iO is enough to hide which program was obfuscated. In our application, the number of differing inputs is of course superpolynomial, however, we notice that the result of Boyle et al. can be generalized: assume that all differing inputs have a prefix in a set S. If finding an element in S is hard even for adversaries running in time poly($\lambda$, |S|), subexponentially secure iO is sufficient to hide which program was obfuscated.

To leverage this observation, we introduce the notion of almost everywhere extractable NIZKs. Such NIZKs are designed so that the prefix of all the valid proofs for which the witness cannot be extracted lies in a set S. Finding an element in S is hard even for adversaries running in time poly($\lambda$, |S|) that are provided with the extraction trapdoor. By using almost everywhere extractable NIZKs together with the generalization of Boyle et al., we can show that $P_0$ and $P_1$ are hard to distinguish despite the existence of differing-inputs. We discuss building such NIZKs later in this overview.

1.4 Security Proof Challenge 2: More Differing Inputs

Decreasing the entropy of the encryption programs. At this point, we can try to prove the security of the candidate lossy distributed sampler. The strategy is the following: using the properties of the almost everywhere extractable NIZKs followed by an input-by-input iO argument, we show that, if the ELF is in injective mode, the special programs are indistinguishable from the usual ones. By switching to a lossy ELF, we can then argue that the distinguishability advantage between the modes of the distributed sampler can be made an arbitrarily small inverse-polynomial function.

There is only one problem that hinders this plan: beyond the differing-inputs caused by the NIZK extraction (which are taken care by the almost everywhere extractable NIZKs), there exist other inputs for which the special programs have a clearly distinguishable behavior. Consider indeed two tuples of encryption programs $(EP_j)_{j\neq 1}$ and $(EP'_j)_{j\neq i}$ having colliding hashes. When these tuples are used along with normal programs for party $P_i$, the outputs of the protocol will be correlated: in both executions, the programs of $P_i$ use the same random string $s_i$ (see how $s_i$ is generated in FIG. 5). If instead $P_i$ sent special programs, the outputs will look independent of each other (see how $\hat{R}$ is generated in FIG. 8).

Even if these problematic inputs are hard to find, this time we do not use the trick by Boyle, Chung and Pass. To work around the issue, we decrease the entropy of the encryption programs: we require that they are generated using the randomness produced by a PRG with a small $\lambda$-bit seed. The almost everywhere extractable NIZKs will guarantee that the adversary does not break this rule. On the other hand, the special programs will use full-entropy randomness. In this way, the total number of valid encryption programs for the corrupted parties becomes smaller than $(2^\lambda)^{n-1}$. By adopting a subexponentially collision-resistant hash function, we can make sure that, with overwhelming probability, there exist no collisions among these $(2^\lambda)^{n-1}$ elements. Moreover, the digests will still be small enough to fit into the encryption programs.

This technique solves also circular dependencies between subexponentially secure primitives: the input-by-input iO argument requires us to work with a number of hybrids that is proportional to the number of valid encryption programs. In each of these hybrids, we need to rely on the security of multi-key FHE. In order for the proof to go through, the size of the multi-key FHE keys therefore needs to increase logarithmically with the number of hybrids. If we used full-entropy encryption programs, the size of the keys would be so large that they would not even fit in the encryption programs anymore. By forcing valid encryption programs to have low entropy, we can hybrid over only the valid programs instead of all possible encryption programs, thereby eliminating the circular dependency. The properties of the NIZK guarantee not only that the adversary cannot find non-valid encryption programs, but that they do not even exist. With these challenges overcome, we prove the following:

Theorem 4 (Informal). Assuming Almost Everywhere Extractable NIZKs, Suberponential iO, Subexponential Multi-Key FHE, Suberponentially Collision-Resistant Hash Functions and Regular Extremely Lossy Functions, the Distributed Sampler Sketched Above is Lossy and Programmable 1.5 Building Indistinguishability-Preserving Distributed Samplers A lossy distributed sampler is not necessarily indistinguishability-preserving. We show, however, that the construction described above actually is:

Theorem 5 (Informal). Assuming Almost Everywhere Extractable NIZKs, Suberponential iO, Suberponential Multi-Key FHE, Subexponentially Collision-Resistant Hash Functions and Regular Extremely Lossy Functions, the Distributed Sampler Sketched Above is Indistinguishability-Preserving We start by considering a protocol $\Pi$ that relies on a CRS sampled from the distribution $\mathcal{D}$. We suppose that $\Pi$ implements a functionality $\mathcal{F}$ as described at the top of FIG. 4. In particular, in the ideal world, the CRS is simulated using a distribution $\mathcal{D}'$ that outputs a trapdoor T along with the sample R.

A sketch of the proof. We use a hybrid argument beginning from the compilation of the real world using the standard mode of our lossy distributed sampler and ending with the compilation of the ideal world using a simulated mode (see the bottom of FIG. 4). We prove that the compiled worlds are computationally indistinguishable.

As a first step, we switch the distributed sampler to lossy mode. This already introduces some non-negligible distinguishability advantage in the proof, we will explain later why this does not constitute a problem. On the other hand, the lossy mode allows us to move to a sample space of polynomial size.

Next, we gradually change the distribution of the outputs of the distributed sampler, switching from $\mathcal{D}$ to $\mathcal{D}'$.. The technique here is rather simple: we just rely on the security of puncturable PRFs similarly to what we did to argue programmability. Along the way, we gradually switch from the execution of $\Pi$, to the execution of the simulator $Sim_\Pi$. In particular, there will some subhybrids in which some of the distributed sampler outputs come from $\mathcal{D}$ and some from $\mathcal{D}'$. We run $Sim_\Pi$ only when the adversary chooses an execution where the sample comes from $\mathcal{D}'$. In these cases, we can retrieve the trapdoor by using the puncturable PRF key K and the ELF hidden in the special programs (see FIG. 8). Observe that, since the sample space is small, switching from $\mathcal{D}$ to $\mathcal{D}'$ needs only a polynomial number of subhybrids. As a consequence, we do not need that $\mathcal{D}$ and $\mathcal{D}'$ are subexponentially indistinguishable, nor that $\Pi$ implements $\mathcal{F}$ with subexponential security.

In the last hybrid, we switch the ELF in the special programs back to injective mode. Once again, the operation introduces a non-negligible distinguishability advantage. However, it allows us to move to a large sample space where all the elements are trapdoored.

The compiled games are indistinguishable. We finally argue why the non-negligible advantage introduced in the first and the last hybrid does not constitute a problem: by contradiction, suppose that there exists an adversary $\mathcal{A}$ that distinguishes between the initial and the final stage with non-negligible advantage $\epsilon$. By choosing sufficiently large parameters for the lossy mode of the ELF, we can ensure that the advantage of $\mathcal{A}$ in the first and the last steps of the proof are both bounded by $\epsilon/4$. The total advantage of $\mathcal{A}$ against the compiled games would therefore be strictly smaller than $\epsilon$, reaching a contradiction.

1.6 Building Almost Everywhere Extractable NIZKs

We obtain almost everywhere extractable NIZKs in the CRS model using perfectly sound NIWIs, subexponentially secure injective one-way functions, perfectly binding commitments and perfectly correct identity-based encryption (IBE).

Consideration of distributed samplers that need a CRS. It may seem strange to have a distributed sampler—whose purpose is to generate a CRS—in turn rely on a CRS. A question arises as to what is the advantage of generating a CRS using a distributed sampler if the latter still needs a CRS. There are several reasons why a distributed sampler using a CRS can be useful: the CRS of the distributed sampler might be reused multiple times, allowing the production of many samples. The CRS of the distributed sampler protocol can also be simple to generate, perhaps because it is short or because it is unstructured (i.e. a uniform string of bits).

Our Construction. The CRS consists of an IBE master public key and a one-way function challenge v. The proofs are associated to the identity of the party that issues them. Each of them consists of a commitment $c_0$, an IBE encryption of the witness $c_1$ under the party's identity and a NIWI guaranteeing that either $c_1$ contains the witness or $C_0$ contains the preimage of v. In order to extract the witness, it is sufficient to decrypt $c_1$.

Observe that, in all valid proofs for which extraction fails, the prefix is a commitment to the preimage of v. Since the one-way function is injective, the number of such prefixes depends only on the size of the randomness of the commitment scheme. As the one-way function is subexponentially secure, we can make v hard to invert even for poly($\lambda$, |S|)-time adversaries that have enough power to brute-force the commitment to retrieve the hidden value. This ensures the property we need.

Use of identity-based encryption. In many applications of almost everywhere extractable NIZKs, we would like to argue that the programs $C_0$ and $C_1$ are indistinguishable even if we simulate the NIZKs of the honest parties (clearly, in these situations, $C_1$ will try to extract the witnesses only from the NIZKs of the corrupted players). The issue is that the NIZK described in the previous paragraph is not simulation-almost everywhere extractable, i.e. leaking simulated proofs may allow distinguishing between $C_0$ and $C_1$. On the other hand, disclosing $C_1$ might compromise the zero-knowledge property of the NIZKs due to the extraction trapdoor hidden into it.

Identity-based encryption allows us to work around the problem: to extract the witness from a NIZK proven under the identity id, we do not need the IBE master secret key, but just the private key associated to id. In other words, if we equip $C_1$ only with the decryption keys associated to the identities of the corrupted players, we are still able to simulate the proofs of the honest parties. The identities associated with the NIZKs guarantee that no corrupted party can publish one of the simulated proofs as it was its own.

Note that some IBE schemes have uniformly random public keys. If we also use a one-way permutation to generate v, then the CRS is actually uniformly random. As such, our resulting distributed samplers will take a uniformly random CRS, and can be used to generate any arbitrarily structured CRS.

Theorem 6 (Informal). Assuming Perfectly Correct IBE, Perfectly Binding Non-Interactive Commitments, Perfectly Sound NIWIs and Subexponential OWFs, the NIZK Sketched Above is Almost Everywhere Extractable

1.7 CRS-Less NIZKs in the Uniform Setting

All the distributed samplers described so far make use of a CRS. The latter, needed by the NIZKs in the construction, is short, reusable and unstructured, however, the question arises as to if it is possible to completely remove it. For indistinguishability-preserving distributed samplers, this is too much to hope for: if that was not the case, we would obtain a 3-round OT protocol with active security by compiling any 2-round OT protocol with CRS. It is known that active OT requires at least 4 rounds. We show, however, that, if we restrict to security against uniform adversaries, we can remove the CRS from all our primitives. We obtain this by constructing CRS-less NIZKs that can be plugged in our distributed samplers.

NIZKs against uniform adversaries. The fact that NIZKs do not need CRSs if we restrict to security against uniform adversaries has been known for almost two decades: the fact was proven by Barak and Pass by building a CRS-less NIZK in the stand-alone model. Bitansky and Lin studied a related question. They designed CRS-less NIZKs with a weak security guarantee against non-uniform adversaries: the number of false statements that can be proven is proportional to the non-uniformity of the adversary. Although this notion does not imply full soundness against uniform adversaries, it is easy to see that their constructions achieve the result. In this way, they indirectly obtain a CRS-less NIZK satisfying a weak form of simulation-soundness: a uniform adversary cannot generate proofs for false statements even if it has oracle access to the NIZK simulator that can be queried only with true statements (in the standard definition of simulation soundness, the simulator can be queried even with false statements).

Beyond these works, the topic remains rather unexplored. In this paper, we show how to construct CRS-less NIZKs achieving full simulation-soundness, simulation extractability and almost-everywhere extractability against uniform adversaries. All our constructions rely on the same trick: in order to simulate a proof, we need to use a trapdoor. Such trapdoor will be infeasible to compute for every uniform adversary but not for the simulator as it will be non-uniform.

Uniform-DDH and uniform-LWE. We start by introducing natural variations of the DDH and LWE assumptions that we believe to hold against uniform adversaries.

Consider a uniform deterministic algorithm DDHGen that outputs the description of a cyclic group $\mathbb{G}$ along with two elements g, h $\in \mathbb{G}$ such that no uniform adversary can find the value $\alpha$ such that h=$g^\alpha$. A heuristic instantiation of this algorithm is to use a SHA hash function, or the digits of $\pi$, to generate g and h. The uniform-DDH assumption states that no uniform adversary can distinguish between pairs ($g^r$, $h^r$) and pairs ($g^r$, $h^s$) where r and s are uniformly random elements. Clearly, the assumption cannot hold against non-uniform adversaries: a non-uniform adversary can receive $\alpha$ as part of its non-uniform advice, at that point, distinguishing is trivial. Even uniform quantum adversaries can trivially distinguish by recovering $\alpha$ using Shor's algorithm. We however believe that it is possible to instantiate the assumption so that all uniform, classical PPT adversaries have subexponentially small advantage.

The uniform-LWE assumption follows a similar blueprint: we use a uniform deterministic algorithm LWEGen to generate the matrix $A \in \mathbb{Z}_q^{m \times n}$ describing a lattice. We then assume that no uniform PPT adversary can distinguish $A^T \cdot s + x$ (where s is uniform in $\mathbb{Z}_q^n$ and x is a short vector in $\mathbb{Z}_q^m$) from a random element in $\mathbb{Z}_q^m$. Once again, we cannot hope to achieve security against non-uniform adversaries: if they receive a small vector u such that $A \cdot u = 0$ as part of their non-uniform advice, they can easily break the assumption. We however believe that every uniform, classical or quantum PPT adversary has a subexponentially small advantage.

1.7.1 the First Simulation-Sound NIZKs

We obtain simulation-sound NIZKs without CRS using two different approaches. We now describe the first one.

Challengeless one-way functions. The first NIZK makes use of challengeless one-way functions (COWFs): a one-way function in which the challenge is deterministically generated by a uniform algorithm. The guarantee is that no uniform PPT adversary can find a preimage of the challenge.

We actually need two COWFs that are independently hard: finding preimages for any of them remains hard even when we are given a preimage for the other one. Uniform-DDH and uniform-LWE easily give a pair of independently hard one-way functions: thanks to the subexponential security of the primitive, we can make sure that, for classical adversaries, breaking uniform-DDH is strictly harder than uniform-LWE. On the other hand, in a post-quantum world, uniform-DDH is broken, while uniform-LWE retains its security. If breaking any of the challengeless one-way functions allows an adversary to break the other one, one of these two facts would be contradicted.

The first approach. The construction follows the blueprint of Barak and Pass. The proof consists of two commitments $c_0$ and $c_1$ along with a signature and a CRS-less NIWI. The NIZKs prove that either the statement lies in the language or one of the commitments hides a preimage for one of the independently hard challengeless one-way functions $COWF_0$ and $COWF_1$. These preimages will be used as trapdoors.

In order to achieve simulation-soundness, we need to ensure that the proof is non-malleable. We therefore generate $c_0$ and $c_1$ using a non-interactive CCA commitment without CRS: each commitment is associated with a tag. The primitive guarantees that, given a commitment, no adversary can derive a commitment to a correlated value under a different tag. In our NIZK, similarly to Groth and Ostrovsky, the tag will be a one-time signature verification key. Such key will be used to sign the proof. This ensures that, in order to produce a NIZK for a false statement, the adversary cannot reuse the commitments in the simulated proofs: it needs to at least change the tag (otherwise, it would need to forge a signature). The CCA security of the commitments guarantees the hardness of this task. Therefore, if the adversary manages to prove a false statement is because it discovered one of the trapdoors.

The need for two challengeless one-way functions. The reason is that we need to argue that the NIWIs in the simulated proofs leak no information about the trapdoors. When the statement for a simulated proof lies in the language, it is guaranteed that the NIWI does not leak the trapdoor. If that was not the case, by witness indistinguishability, the trapdoor would have been leaked even if the NIWI was generated using the witness for our statement. This contradicts the fact that the trapdoor is hard to compute. The question arises as to what instead if the statement does not lie in the language. In this case, the NIWI does not allow us to tell which trapdoor was used for its generation, however, it might leak some generic information about them, e.g. the minimal trapdoor according to the lexicographical order.

Using two independently hard, challengeless one-way function, we avoid this problem: by the independent hardness, if we use the $COWF_0$ trapdoors for the simulated proofs, the NIWIs cannot leak any $COWF_1$ trapdoor and vice-versa. By witness indistinguishability, we conclude that the NIWIs do not leak any of the trapdoors.

Theorem 7 (Informal). Assuming Suberponential Independently Secure COWFs, Non-interactive CCA-Commitments without CRS, Subexponential CRS-Less NIWIs and Strong One-Time Signatures, the CRS-Less NIZK Sketched Above is Simulation-Sound Against Uniform Adversaries

1.7.2 the Second Simulation-Sound NIZK

We describe the second approach to build simulation-sound NIZKs without CRS.

Labelled, challengeless one-way functions (LOWF). Our second simulation-sound NIZK makes instead use of labelled, challengeless one-way functions CLOWF: on input any label id, a uniform algorithm deterministically generates a one-way function challenge. The primitive guarantees that no uniform PPT adversary can invert any challenge even given the preimages associated with some of the other labels. A heuristic instantiation of this primitive can use a SHA hash function to generate the verification key for a deterministic signature scheme. In this case, the preimage associated with a label id consists of a signature on id.

The second approach. Building simulation-sound NIZKs with the second approach is perhaps even easier: each proof consists of a commitment c, a CRS-less NIWI, a signature and the relative verification key vk. The NIWI is used to prove that either the statement belongs to the language or c hides a preimage for CLOWF where the label is vk. Such preimage acts as a trapdoor.

We use a signature over the whole proof to ensure that, if the adversary manages to prove a false statement, it uses a fresh verification key (otherwise, it would have succeeded in forging a signature). That means that the adversary needs to find a preimage relative to a fresh label of CLOWF. The trapdoors used in the simulated proof do not help in this task. We can therefore achieve simulation-soundness even with malleable commitments.

Theorem 8 (Informal). Assuming Subexponential LOWF, Perfectly Binding Non-Interactive Commitments, CRS-Less NIWIs and Strong One-Time Signatures, the CRS-Less NIZK Sketched Above is Simulation-Sound Against Uniform Adversaries

1.7.3 CRS-Less Simulation-Extractable NIZK

In order to build simulation-extractable NIZKs, we introduce CRS-less non-interactive extractable commitment schemes. Observe that the primitive can exist only if we restrict to security against uniform adversaries. We build two schemes. The first one is based on uniform-DDH, the second one on uniform-LWE. A commitment consists of an encryption of the value using the public keys deterministically produced by either DDHGen or LWEGen. In the first case, we use ElGamal, in the second case, we use dual-LWE. To extract the value, it is sufficient to perform a decryption (the extractor will be a non-uniform algorithm). The operation is however infeasible for the adversary as the secret key is hard to compute in uniform polynomial-time.

In order to obtain a simulation-extractable NIZK, we simply generate an extractable commitment c to the witness for the statement we want to prove. We then use a simulation-sound NIZK to prove that c is indeed what we claim it to be.

Theorem 9 (Informal). Assuming CRS-Less Simulation-Sound NIZKs and Subexponential CRS-Less Non-Interactive Extractable Commitments, the CRS-Less NIZK Sketched Above is Simulation-Extractable Against Uniform Adversaries

1.7.4 CRS-Less Almost Everywhere Extractable NIZK

We finally present a CRS-less almost everywhere extractable NIZK with security against uniform adversaries. Differently from the construction described in Section 1.2, this NIZK will use a single extraction trapdoor for every prover's identity. On the other hand, the scheme will remain almost everywhere extractable even if we provide oracle access to the zero-knowledge simulator (we call the property simulation-almost everywhere extractability). This ensures that the obfuscated programs $P_0$ and $P_1$ remain indistinguishable even if the proofs of the honest parties are simulated (we recall that $P_0$ is a program that verifies the NIZKs proving the well-formedness of its inputs, while $P_1$ instead tries to extract the witnesses from them).

Independently secure labelled one-way functions and extractable commitments. The construction makes use of a labelled challengeless one-way function CLOWF and a non-interactive extractable commitment. The two primitives need to be independently secure: they need to retain their security properties even when we leak the other primitive's trapdoor. We can for instance ensure this using the same trick we adopted for simulation-sound NIZKs: we use a post-quantum extractable commitment (which can be obtained from uniform-LWE) and a quantumly-broken labelled, challengeless one-way function (heuristically, we can obtain it from any DLOG-based deterministic signature).

The reason why we need independently secure primitives is that almost everywhere extractability always requires that the simulation trapdoor (i.e. the trapdoor for CLOWF) is hard to compute in uniform polynomial time even if we leak the extraction trapdoor (i.e. the trapdoor for the extractable commitment). On the other hand, in our construction, the proof of zero-knowledge would require the symmetric relation. Independent security allows us to satisfy both conditions simultaneously.

The simulation-almost everywhere extractable NIZK without CRS. A proof consists of two commitments $c_0$ and $c_1$, where $c_1$ is extractable, along with a CRS-less NIWI. The latter proves that either $c_1$ hides a witness for the statement we want to prove or $c_0$ hides a preimage for CLOWF where the label is the identity of the prover. In all the proofs where extraction fails, $c_0$ will therefore satisfy this second condition.

We select CLOWF so that the preimage for any given label is unique. In this way, the number of prefixes of problematic NIZKs for a given prover identity depends only on the size of the randomness of the commitment scheme. Since CLOWF is subexponentially secure, we can ensure that finding the right CLOWF preimage is infeasible even for poly($\lambda$, $|S|$)-time adversaries (S denotes the set of problematic prefixes) that have enough computational power to recover the value hidden in $c_0$. Finding elements in S is therefore hard even for poly($\lambda$, $|S|$)-time algorithms. Learning simulated proofs under other provers' indentities does not help the adversary in the task.

Theorem 10 (Informal). Assume the Existence of a Suberponential Injective LOWF and a CRS-Less Non-Interactive Extractable Commitment that are Independently Secure. Assume Perfectly Binding Non-Interactive Commitments and CRS-Less NIWIs. Then, the CRS-less NIZK Sketched Above is Simulation-Almost Everywhere Extractable Against Uniform Adversaries

2 Notation and Preliminaries

We formalise the notation and recall security definitions and basic results used in this work.

Basic notation. We denote the security parameter by $\lambda$. For any $n \in \mathbb{N}$, we use [n] to denote the set $\{1, 2, \ldots, n\}$. For any binary string a and integer l, $\text{Trunc}_l(x)$ denotes the prefix of a consisting of its first l bits. Moreover, for any integers $l_0 < l_1$, we use $\text{Trunc}_{l_0}^{l_1}(x)$ to denote the substring of a consisting of the bits from the $l_0$-th position to the $l_1$-th one. Given any NP relation $\mathcal{R}$, we denote the corresponding language by $L\mathcal{R}$.

Algorithm execution. For any deterministic algorithm $\mathcal{A}$ and input x, we use the expression $a \leftarrow \mathcal{A}(x)$ to assign the output of the algorithm $\mathcal{A}$ on input x to the variable a. When $\mathcal{A}$ is probabilistic, we instead use $a \xleftarrow{\$} \mathcal{A}(x)$. Finally, if $\mathcal{A}$ is randomised, we use $a \leftarrow \mathcal{A}(x; r)$ to mean that a is assigned the output of $\mathcal{A}$ on input x and randomness r. If x is variable, we use $a \leftarrow x$ to assign the value of x to a. If X is a set, instead, we use $a \xleftarrow{\$} X$ to mean that a is assigned a value sampled from X uniformly at random. If $\mathcal{A}$ and $\mathcal{O}$ are algorithms, for any x and y, we use $\mathcal{A}^{\mathcal{O}(y,\cdot)}(x)$ to denote the value output by $\mathcal{A}$ on input a while having unbounded oracle access to $\mathcal{O}(y,\cdot)$. In other words, at any point in time, $\mathcal{A}$ can send values s to an oracle, which replies with $\mathcal{O}(y, z)$. We use the term efficient distribution to denote a uniform PPT algorithm taking only the security parameter as input.

Asymptotic behaviour. We use negl($\lambda$) (resp. nonegl($\lambda$)) to denote a generic negligible (resp. non-negligible) function in the security parameter. Similarly, we use poly$(X_1, \ldots, X_n)$ to denote a generic function that is upper-bounded by a polynomial in the given variables $X_1, \ldots, X_N$. Given two functions $S_0(\lambda)$ and $S_1(\lambda)$, we say that $S_0(\lambda) \ll S_1(\lambda)$ if $S_0(\lambda)$ is a poly($\lambda$, $S_1(\lambda)$) function but $S_1(\lambda)$ is not poly($\lambda$, $S_0(\lambda)$).

Uniform vs non-uniform adversaries. We recall that a non-uniform algorithm consists of a randomised Turing machine that, at the beginning of its execution, receives a polynomial-size advice string, whose value depends only on the security parameter. A uniform algorithm is instead a randomised Turing machine that receives no such advice string. Throughout the paper, we use AClass to denote either the class of uniform algorithms or the class of non-uniform algorithms. Observe that the latter is strictly larger than the former.

Multiparty computation. In the paper, we deal with multiparty protocols. We always assume the existence of authenticated point-to-point channels along with an authenticated broadcast medium. We often denote the i-th party by $P_i$. We also assume that each party is associated with a unique identity id known to all the other players. We work with static corruption and we denote the set of honest parties by H. We say that a CRS is unstructured if it is computationally indistinguishable from a uniformly random string of a given length.

Subexponential security. We say that a primitive is subexponentially secure if there exists e>0 such that the advantage of every adversary running in poly($2^{\lambda^{\varepsilon}}$) time in the relative security game is asymptotically smaller than $2^{-\lambda^{\varepsilon}}$.

2.1 One-Way Functions

We recall the definition of one-way function (OWF): a function that can be efficiently computed but hard to invert on random instances.

Definition 1 (One-Way Function). A One-Way Function is a Pair of Uniform PPT Algorithms (Gen, OWF) with the Following Syntax Gen is randomised, takes as input the security parameter $\mathbb{1}^\lambda$ and outputs a pair $(v, u)$.

OWF is deterministic and takes as input the security parameter $\mathbb{1}^\lambda$ and a value $u$. The output is a value $v$.

We require the following properties.

(Correctness). For every $\lambda \in \mathbb{N}$, we have $$Pr\left[OWF(\mathbb{1}^\lambda, u) = v \middle| (v, u) \xleftarrow{\$} Gen(\mathbb{1}^\lambda)\right] = 1.$$

(Security). For every PPT adversary $\mathcal{A}$, we have $$Pr\left[OWF(\mathbb{1}^\lambda, u') = v \middle| (v, u) \xleftarrow{\$} Gen(\mathbb{1}^\lambda), u' \xleftarrow{\$} \mathcal{A}(\mathbb{1}^\lambda, v)\right] = negl(\lambda).$$

We say that the the one-way function is injective if $$Pr\left[\exists u' \neq u \;\; OWF(\mathbb{1}^\lambda, u') = v \middle| (v, u) \xleftarrow{\$} Gen(\mathbb{1}^\lambda)\right] = 0.$$

One-way functions, including subexponentially secure ones, can be built using well studied assumptions.

2.2 Puncturable PRFs

We recall now the definition of puncturable PRF. As for a standard PRF, it consists of a keyed functions whose outputs are indistinguishable from random as long as the key remains secret. The primitive, however, satisfies an additional property: it is possible to generate punctured keys. The latter permit evaluating the PRF in any point of its domain except for the punctured position. Furthermore, even if the punctured key is disclosed, the value of the PRF at the punctured position remains indistinguishable from random.

Definition 2 (Puncturable PRF). Let $p(\lambda)$ and $q(\lambda)$ be Polynomial Functions. A Puncturable PRF with Input Size $p(\lambda)$ and Output Size $q(\lambda)$ is a Pair of Uniform PPT Algorithms (Gen, F, Punct) with the Following Syntax:

Gen is randomised, takes as input the security parameter $\mathbb{1}^\lambda$ and outputs a key $K$.

F is deterministic and takes as input a key $K$ and a value $x \in \{0, 1\}^{p(\lambda)}$. The output is a pseudorandom string $y \in \{0, 1\}^{q(\lambda)}$.

Punct is deterministic and takes as input a key $K$ and a value $x \in \{0, 1\}^{p(\lambda)}$. The output is a punctured key $K^*$.

We require the following properties.

(Correctness). For every pair of distinct values $x$ and $x'$ in $\{0, 1\}^{p(\lambda)}$, we have $$Pr\left[F(K, x') = F(K^*, x') \middle| K \xleftarrow{\$} Gen(\mathbb{1}^\lambda), K^* \leftarrow Punct(K, x)\right] = 1.$$

(Security). For every pair of PPT adversaries ($\mathcal{A}_1$, $\mathcal{A}_2$), we have $$\left|Pr\left[A_2(\psi, K^*, y_b) = b \middle| \begin{array}{l} b \xleftarrow{\$} \{0, 1\} \\ K \xleftarrow{\$} Gen(\mathbb{1}^\lambda) \\ (x, \psi) \xleftarrow{\$} \mathcal{A}_1(\mathbb{1}^\lambda) \\ K^* \leftarrow Punct(K, x) \\ y_0 \leftarrow F(K, x) \\ y_1 \xleftarrow{\$} \{0, 1\}^{q(\lambda)} \end{array}\right] - \frac{1}{2}\right| = negl(\lambda).$$

Puncturable PRFs, even with subexponential security, can be easily constructed using one-way functions.

2.3 Hash Functions

We recall now the definition of collision resistant hash function. Essentially, the latter consists of a keyed function for which it is hard to find pairs of different elements that are mapped to the same value. Security relies on the unpredictability of the key. It is possible to build subexponentially secure collision resistant hash functions from well studied assumptions.

Definition 3 (Collision Resistant Hash Function). Let $p(\lambda)$ and $t(\lambda)$ be Polynomial Functions. A Hash Function with Input Size $p(\lambda)$ and Digest Size $t(\lambda)$ is a Pair of Uniform PPT Algorithms (Gen, Hash) with the Following Syntax:

Gen is randomised, takes as input the security parameter $\mathbb{1}^\lambda$ and outputs an hash key $hk$.

Hash is deterministic and takes as input a hash key $hk$ and a value $x \in \{0, 1\}^{p(\lambda)}$. The output is a digest $y \in \{0, 1\}^{t(\lambda)}$.

We say that the hash function is collision resistant if, for PPT adversary A, we have $$\left|Pr\left[\begin{array}{l} x_0 \neq x_1 \\ Hash(hk, x_0) = Hash(hk, x_1) \end{array} \middle| \begin{array}{l} hk \xleftarrow{\$} Gen(\mathbb{1}^\lambda) \\ (x_0, x_1) \xleftarrow{\$} \mathcal{A}(\mathbb{1}^\lambda, hk) \end{array}\right]\right| = negl(\lambda).$$

Applied cryptography makes often use of a keyless version of the above primitive for which finding collisions is still believed to be hard. We formalise the definition below. We highlight that this primitive can hope to achieve security only against uniform adversaries. Indeed, since there is no randomness involved in the construction, a non-uniform adversary can be given a collision as part of its advice string.

Definition 4 (Keyless Collision Resistant Hash Function). Let $p(\lambda)$ and $t(\lambda)$ be Polynomial Functions. A Keyless Hash Function with Input Size $p(\lambda)$ and Digest Size $t(\lambda)$ is a Uniform Deterministic Polynomial Time Algorithm KHash that Takes as Input the Security Parameter $\mathbb{1}^\lambda$ and a Value $x \in \{0, 1\}^{p(\lambda)}$. The Output is a Digest $y \in \{0, 1\}^{t(\lambda)}$.

We say that the keyless hash function is collision resistant if, for every uniform PPT adversary $\mathcal{A}$, we have $$\left|Pr\left[x_0 \neq x_1, KHash(\mathbb{1}^\lambda, x_0) = KHash(\mathbb{1}^\lambda, x_1) \middle| (x_0, x_1) \xleftarrow{\$} \mathcal{A}(\mathbb{1}^\lambda)\right]\right| = negl(\lambda).$$

2.4 Commitments

In this subsection, we recall definitions of non-interactive commitments. A non-interactive commitment scheme is a primitive that allows encoding a message m in a string c, called the commitment. By itself, c hides the value of m, so it can be distributed to other parties without fear of revealing its secret. At a later point in time, the commitment can however be opened, disclosing the value hidden into it. The scheme guarantees the hardness of opening c to any value other than m. In other words, after the commitment is opened, the parties can be sure that who generated c had been already committed to revealing m since the time c was sent.

In this paper, we will make use of perfectly binding, computationally hiding non-interactive schemes. In particular, that means that the value hidden in the commitment remains secret only to computationally bounded adversaries. Furthermore, the commitment c uniquely determines the value hidden into it. Such schemes can be built, even with subexponential security, based on well-studied assumptions.

Definition 5 (Non-Interactive Commitment Scheme). Let $p(\lambda)$ be a Polynomial Function. a Non-Interactive Commitment Scheme with Message Size $p(\lambda)$ is a Uniform PPT Algorithm Com that Takes as Input the Security Parameter $\mathbb{1}^\lambda$ and a Message $m \in \{0, 1\}^{p(\lambda)}$. The Output is a Commitment c.

We say that the scheme is perfectly binding if, for every $\lambda \in \mathbb{N}$, there exist no pairs $(m_0, r_0)$ and $(m_1, r_1)$ such that $m_0 \neq m_1$ and $\text{Com}(\mathbb{1}^\lambda, m_0; r_0) = \text{Com}(\mathbb{1}^\lambda, m_1; r_1)$. We say that the scheme is computationally hiding if, for every pair of PPT adversaries $(\mathcal{A}_1, \mathcal{A}_2)$, we have $$\left| Pr\left[ \mathcal{A}_2(\psi, c) = b \,\middle|\, \begin{array}{l} b \xleftarrow{\$} \{0, 1\} \\ (m_0, m_1, \psi) \xleftarrow{\$} \mathcal{A}_1(\mathbb{1}^\lambda) \\ c \xleftarrow{\$} \text{Com}(\mathbb{1}^\lambda, m_b) \end{array} \right] - \frac{1}{2} \right| = negl(\lambda).$$

We also recall the definition of computation-enabled CCA commitment. This is a particular type of commitment that satisfies non-malleability. That means that given a commitment c hiding a value m, we are not able to derive another commitment c' that hides some value m' correlated to m. This property is formulated by augmenting the commitment algorithm with tags. Formally, we require that, if a value m is committed along with a tag id, m remains hidden even if the adversary has access to an inefficient oracle that extracts the values from the queried commitments. Clearly, the oracle accepts only commitments that use tags different from id.

Obtaining non-interactive non-malleable commitments with large tag space without relying on setups is not an easy task. For this reason, in this paper, we rely on constructions of this kind that achieve security only against uniform adversaries. In particular, the primitive we are interested in satisfies computation-enabled CCA security, meaning that, at the beginning of the game we described above, the uniform adversary is allowed to query a possibly inefficient, randomised Turing machine with no input. The challenger provides the adversary with the result of the machine execution.

Definition 6 (Computation-Enabled CCA Commitment). Let $p(\lambda)$ and $q(\lambda)$ be Polynomial Functions, Let $e > 0$. A e-Computation Enabled CCA Commitment Scheme with Message Size $p(\lambda)$ and Tag Size $q(\lambda)$ is a Pair of Uniform Algorithms (CCACom, Val) with the Following Syntax:

CCACom is PPT and takes as input the security parameter $\mathbb{1}^\lambda$, a tag $id \in \{0, 1\}^{q(\lambda)}$ and a message $m \in \{0, 1\}^{p(\lambda)}$. The output is a commitment c.

Val is deterministic and inefficient. It takes as input a label id and a commitment c and outputs either a message $m \in \{0, 1\}^{p(\lambda)}$ or $\bot$.

We require the following properties.

(Correctness). For every $\lambda \in \mathbb{N}$, $id \in \{0,1\}^{q(\lambda)}$ and $m \in \{0, 1\}^{p(\lambda)}$, we have $$Pr\left[ \text{Val}(id, c) = m \,\middle|\, c \xleftarrow{\$} \text{CCACom}(\mathbb{1}^\lambda, id, m) \right] = 1.$$

(CCA-Hiding). For every polynomials $t(\lambda)$ and $s(\lambda)$, no uniform PPT adversary $\mathcal{A}$ can win the game in FIG. 9 with non-negligible advantage.

FIG. 9 illustrates an example CCA-hiding game.

2.5 Strong One-Time Signatures

We recall here the definition of strong one-time signature. Informally, this consists in a signing scheme for which it is hard to craft forgeries if we are given access to just one signature. The scheme is strong in the sense that, given a signature s for a message m, it is even hard to find another signature s' for m. Strong one-time signatures can be built from one-way functions.

Definition 7 (Strong One-Time Signature). Let $p(\lambda)$ be a Polynomial Function. A Strong One-Time Signature is a Triple of Uniform PPT Algorithms (Gen, Sign, Verify) with the Following Syntax:

Gen is randomised and takes as input the security parameter $\mathbb{1}^\lambda$. The output is a key pair (vk, sk).

Sign is randomised and takes as input a secret key sk and a message $m \in \{0, 1\}^{p(\lambda)}$. The output is a signature s.

Verify is deterministic and takes as input a verification key vk, a message $m \in \{0, 1\}^{p(\lambda)}$ and a signature s. The output is a bit $b \in \{0, 1\}$.

We require the following properties (Correctness). For every $m \in \{0, 1\}^{p(\lambda)}$, we have $$Pr\left[ \text{Verify}(vk, m, s) = 1 \,\middle|\, (vk, sk) \xleftarrow{\$} \text{Gen}(\mathbb{1}^\lambda), s \xleftarrow{\$} \text{Sign}(sk, m) \right] = 1.$$

(Security). For every pair of PPT adversaries $(\mathcal{A}_1, \mathcal{A}_2)$, we have $$Pr\left[ \begin{array}{l} (s, m) \neq (\hat{s}, \hat{m}) \\ \text{Verify}(vk, m, s) = 1 \end{array} \,\middle|\, \begin{array}{l} (vk, sk) \xleftarrow{\$} \text{Gen}(\mathbb{1}^\lambda) \\ (\hat{m}, \psi) \xleftarrow{\$} \mathcal{A}_1(\mathbb{1}^\lambda, vk) \\ \hat{s} \xleftarrow{\$} \text{Sign}(sk, \hat{m}) \\ (s, m) \xleftarrow{\$} \mathcal{A}_2(\psi, \hat{s}) \end{array} \right] = negl(\lambda).$$

2.6 Non-Interactive Witness Indistinguishability

We recall the definition of non-interactive witness-indistinguishable proof (NIWI). Essentially, this consists of a construction specifying how to prove that a given statement x belong to a language using a single message. In order to be efficient, the algorithm that generates the proof needs to receive a witness for x as input. The primitive does not guarantee that the proof keeps the witness secret. It achieves, however, a weaker form of security stating that if there are multiple witnesses for the same statement x, the proof does not disclosed which witness was used for its generation.

It is possible to build subexponentially secure NIWI proofs without setups from various assumptions, specifically, DLIN, derandomisation and indistinguishability obfuscation.

Definition 8 (NIWI Proof). Let $\mathcal{R}$ be an NP Relation. A NIWI Proof is a Pair of Uniform PPT Algorithms (Prove, Verify) with the Following Syntax:

Prove is randomised and takes as input the security parameter $1^\lambda$,, a statement x and a witness w. The output is a proof $\pi$.

Verify is deterministic and takes as input a proof $\pi$ and a statement x. The output is a bit b$\in \{0,1\}$.

We require the following properties.

(Completeness). There exists a negligible function negl (A) such that, for every (x, w)$\in \mathcal{R}$, we have $$Pr\left[\text{Verify}(\pi, x) = 1 \middle| \pi \xleftarrow{\$} \text{Prove}(1^\lambda, x, w)\right] = 1 - negl(\lambda).$$

(Perfect Soundness). If x$\notin$ L$\mathcal{R}$, there exists no $\pi$ such that Verify($\pi$, x)=1.

(Witness-Indistinguishability). For every pair of PPT adversaries $(\mathcal{A}_1, \mathcal{A}_2)$, we have $$\left| Pr\left[\mathcal{A}_2(\psi, \pi) = b \middle| \begin{array}{l} b \xleftarrow{\$} \{0, 1\} \\ (x, w_0, w_1, \psi) \xleftarrow{\$} \mathcal{A}_1(1^\lambda) \\ \pi \xleftarrow{\$} \text{Prove}(1^\lambda, x, w_b) \\ \text{If } (x, w_0) \notin \mathcal{R} \text{ or } (x, w_1) \notin \mathcal{R}: \pi \leftarrow \bot \end{array}\right] - \frac{1}{2} \right| = negl(\lambda).$$

2.7 Identity-Based Encryption

We recall the definition of identity-based encryption (IBE). An IBE scheme is a public-key encryption scheme that is augmented with an access policy: each ciphertext and each secret key is associated with an identity. It is possible to decrypt only if two identities match. Holding keys associated with other identities gives no help in retrieving information about the plaintext.

Definition 9 (Identity-Based Encryption). Let p($\lambda$) and q($\lambda$) be Polynomial Functions. An Identity-Based Encryption Scheme (IBE) with Message Size p($\lambda$) and Identity Size q($\lambda$) is a Tuple of Uniform PPT Algorithms (Setup, Extract, Enc, Dec) with the Following Syntax:

Setup is randomised and takes as input the security parameter $1^\lambda$. . The output is a key pair (mpk, msk).

Extract is randomised and takes as input a master secret key msk and an identity id$\in \{0, 1\}^{q(\lambda)}$. The output is a secret-key sk.

Enc is randomised and takes as input a master public key mpk, an identity id$\in \{0, 1\}^{q(\lambda)}$ and a message m$\in \{0, 1\}^{p(\lambda)}$. The output is a ciphertext c.

Dec is deterministic and takes as input a secret-key sk and a ciphertext c. The output is a message m or $\bot$.

We require the following properties.

(Perfect Correctness). For every id $\in \{0, 1\}^{q(\lambda)}$ and m$\in \{0, 1\}^{p(\lambda)}$, $$Pr\left[\text{Dec}(sk, c) = m \middle| \begin{array}{l} (mpk, msk) \xleftarrow{\$} \text{Setup}(1^\lambda) \\ c \xleftarrow{\$} \text{Enc}(mpk, id, m) \\ sk \xleftarrow{\$} \text{Extract}(msk, id) \end{array}\right] = 1.$$

(IND-ID-CPA security). No PPT adversary can win the game in FIG. 10 with non-negligible advantage.

FIG. 10 illustrates an example IND-ID-CPA game.

Subexponentially secure IBE schemes can be built in the plain model using a large variety of assumptions.

2.8 Indistinguishability Obfuscation

We recall the definition of indistinguishability obfuscation. An indistinguishability obfuscation is an algorithm that modifies a circuit without altering its input-output behaviour. The result is however so "scrambled" that it is hard to tell what the original circuit looked like. In this paper, we use the terms "circuit" and "program" interchangeably.

Definition 10 (Indistinguishability Obfuscator). An Indistinguishability Obfuscator is a Uniform PPT Algorithm iO that Takes as Input the Security Parameter $1^\lambda$ and a Circuit C. The output is an obfuscate program $\tilde{C}$. We require the following properties.

(Perfect Correctness). For every circuit C and input x, we have $$Pr\left[C(x) = \tilde{C}(x) \middle| \tilde{C} \xleftarrow{\$} iO(1^\lambda, C)\right] = 1.$$

(Security). For every PPT adversary A and sampler Samp outputting same-size circuits $C_0$ and $C_1$ such that $\forall$x: $C_0(x)=C_1(x)$ along with auxiliary information aux, we have $$\left| Pr\left[\mathcal{A}(1^\lambda, \tilde{C}, C_0, C_1, aux) = b \middle| \begin{array}{l} b \xleftarrow{\$} \{0, 1\} \\ (C_0, C_1, aux) \xleftarrow{\$} \text{Samp}(1^\lambda) \\ \tilde{C} \xleftarrow{\$} iO(1^\lambda, C_b) \end{array}\right] - \frac{1}{2} \right| = negl(\lambda).$$

Although the initial obfuscation constructions were based on non-standard assumptions, the field has recently shown significant progress. State-of-the-art obfuscators can indeed be based on the subexponential hardness of well-founded problems. Notice that the subexponential security of obfuscation is a common assumption in cryptography.

In this paper, we will use indistinguishability obfuscators satisfying a particular property called injectivity. In other words, it is guaranteed that the obfuscation of distinct circuits will never collide. It is easy to obtain this property by appending a perfectly binding commitment of the unobfuscated circuit to the obfuscated program.

Definition 11 (Injective Indistinguishability Obfuscator). We Say that an Indistinguishability Obfuscator iO is Injective if, for Every $\lambda \in \mathbb{N}$, there Exist No Pairs $(C_0, r_0)$ and $(C_1, r_1)$ Such that $C_0 \neq C_1$ but $iO(1^\lambda, C_0; r_0)=iO(1^\lambda, C_1; r_1)$.

2.9 Multi-Key FHE

We recall the definition of multi-key fully homomorphic encryption. As standard FHE, multi-key FHE scheme is a public key encryption scheme that allows homomorphically applying functions on encrypted values deriving encryptions of the outputs. The evaluation of the function is performed locally and no information about the plaintexts is revealed in the process. The big advantage of multi-key FHE is that, while standard FHE allows performing operations only between ciphertexts encrypted under the same public key, multi-key FHE suffers from no such restriction: we can evaluate functions on inputs encrypted under different keys, obtaining an encryption of the output under a "joint key". In order to decrypt the latter, the parties need to collaborate: each player will locally compute a partial decryption using its own private key. By pooling together the partial plaintexts, everybody can retrieve the result.

Subexponentially secure multi-key FHE without CRS can be built based on LWE and DSPR, or obfuscation and DDH. In this paper, we rely on the definition from Ananth, Jain, Jin, and Malavolta.

Definition 12 (Multi-Key FHE). An Multi-Key Fully Homomorphic Encryption Scheme is a Tuple of Uniform PPT Algorithms (Gen, Enc, Eval, PartDec, FinDec) with the Following Syntax:

Gen is randomised and takes as input the security parameter $1^\lambda$. The output is a key pair (pk, sk).

Enc is randomised and takes as input a public key pk and a message m. The output is a ciphertext c.

Eval is deterministic and takes as input a function $f$ and n pairs ($pk_i$, $c_i$) where n is the number of inputs of $f$. The output is a ciphertert C encrypted under the joint public key ($pk_1, \ldots, pk_n$).

PartDec is randomised and takes as input a ciphertert C, n public keys $pk_1, \ldots, pk_n$ for some $n \in \mathbb{N}$, an index $i \in [n]$ and a secret key sk. The output is a partial decryption d.

FinDec is deterministic and takes as input n partial decryptions $d_1, \ldots, d_n$ for some $n \in \mathbb{N}$. The output is a message m or $\perp$.

We require the following properties.

(Correctness). For every function $f$ with n inputs and values $x_1, \ldots, x_n$, we have $$Pr\left[m = f(x_1, \ldots, x_n) \middle| \begin{array}{l} \forall i \in [n]:(pk_i, sk_i) \xleftarrow{\$} Gen(1^\lambda) \\ \forall i \in [n]:c_i \xleftarrow{\$} Enc(pk_i, x_i) \\ C \leftarrow Eval(f, pk_1, c_1, \ldots, pk_n, c_n) \\ \forall i \in [n]:d_i \xleftarrow{\$} PartDec(C, pk_1, \ldots, pk_n, i, sk_i) \\ m \leftarrow FinDec(d_1, \ldots, d_n) \end{array}\right] = 1.$$

(Reusable Semi-Malicious Security). There exists uniform PPT simulators $Sim_1$ and $Sim_2$ such that no PPT adversary A can win the game in FIG. 11 with non-negligible advantage.

FIG. 11 illustrates an example multi-key FHE security game.

2.10 Extremely Lossy Functions

We recall the definition of extremely lossy function (ELF). An ELF is a function $f$ parametrised by two values M and r. The former denotes the cardinality of its domain, whereas r denotes an upper bound on the size of the image. When M=r, the function is guaranteed to be injective. When $r \neq M$, we say that the ELF is in lossy mode. The primitive ensures that, by choosing a sufficiently large poly(log M) value r, the advantage in distinguishing between an injective ELF and a lossy ELF can be made an arbitrarily small inverse polynomial function in log M. Extremely lossy functions can be built based on the exponential hardness of DDH over elliptic curves.

Definition 13 (Extremely Lossy Function). An Extremely Lossy Function (ELF) Consists of a Uniform PPT Algorithm Gen that Takes as Input Two Integers M and r. The Output is the Description of a Function $f$ with Domain [M]. The Primitive Uses Log M as Security Parameter. We Require the Following Properties.

$f$ is computable in poly log (M) time and the running time is independent of r.

If $$r = M, Pr\left[\exists x \neq y \text{ s.t. } f(x) = f(y) \middle| f \xleftarrow{\$} Gen(M, M)\right] = negl(\log M).$$

There every $$r \in [M], Pr\left[|f([M])| \geq r \middle| f \xleftarrow{\$} Gen(M, r)\right] = negl(\log M).$$

For every polynomial p and inverse polynomial function $\delta$, there exists a polynomial q such that, for every adversary $\mathcal{A}$ running in time at most p(log M), and $r \geq q(\log M)$, we have $$\left|Pr\left[A(M, r, f_b) = 1 \middle| \begin{array}{l} b \xleftarrow{\$} \{0, 1\} \\ f_1 \xleftarrow{\$} Gen(M, r) \\ f_0 \xleftarrow{\$} Gen(M, M) \end{array}\right] - \frac{1}{2}\right| \leq \delta(\log M).$$

In the constructions in this paper, log M will be both poly($\lambda$) and $\Omega(\lambda)$. Therefore, every negligible function in log M will also be negligible in $\lambda$ (and viceversa). Similarly, every polynomial function in log M will also be polynomial in $\lambda$ (and viceversa).

We now recall the definition of regular ELF. Informally, an ELF is regular if, by applying the function on a random domain element, we hit all the elements in the image with at least inverse-polynomial probability in r and log M. Regular ELFs can be built based on exponential DDH.

Definition 14 (Regular ELF). An ELF is Regular if there Exists s=Poly(Log M, r) Such That, Except with Negligible Probability Over $$f \xleftarrow{\$} Gen(M, r),$$

For Ever $y \in f([M])$, we have $$Pr_x\left[f(x) = y \middle| x \xleftarrow{\$} [M]\right] \geq \frac{1}{s(\log M, r)}.$$

Where $P_x r$ is a Probability Taken Over the Randomness of x.

We also recall the definition of strongly efficiently enumerable ELF. This consists an ELF in which it is possible to reconstruct the image in poly(log M, r) time.

Definition 15 (Strongly Efficiently Enumerable ELF). An ELF is Strongly Efficiently Enumerable if there Exists a Randomise Algorithm Enum Running in Poly(Log M, r) Time Such that, for Every $r \in [M]$, $$Pr\left[S \neq f([M]) \middle| f \xleftarrow{\$} Gen(M, r), S \xleftarrow{\$} Enum(M, 1^r, f)\right] \leq negl(\log M).$$

It easy to show that every regular ELF is strongly efficiently enumerable.

Theorem 11. a Regular ELF is Strongly Efficiently Enumerable

3 Almost Everywhere Extractable NIZKs

In this section, we formalise definitions and results about almost everywhere extractable NIZKs.

The main lemma. We start by generalising of the result by Boyle, Chung and Pass. This is the main lemma almost everywhere extractable NIZKs rely upon.

Lemma 12. Let Samp be a Probabilistic Algorithm Outputting Two Circuits $C_0$, $C_1$ with Input Space $\{0, 1\}^{m(\lambda)}$, Auxiliary Information Aux and a Secret ρ. Let $\mathcal{O}$ be Another Probabilistic Algorithm that on Input a Pair (ρ, x) Outputs a Value y. Suppose the Following.

there exist efficiently computable values $l_0(C_0, C_1, aux)$, $l_1 (C_0, C_1, aux)$ and $d(\lambda)$ (the latter potentially superpolynomial) such that where $$Pr\left[\left|DI_{C_0,C_1}^{\ell_0,\ell_1}\right| \leq d(\lambda) \middle| (C_0, C_1, aux, \rho) \overset{\$}{\leftarrow} Samp(1^\lambda)\right] = 1 - negl(\lambda),$$

$$DI_{C_0,C_1}^{\ell_0,\ell_1} := \{Trunc_{\ell_0}^\ell(x)|C_0(x) \neq C_1(x)\}.$$

for every probabilistic adversary $\mathcal{A} \in$ AClass running in poly($\lambda$, d($\lambda$)) time, $$Pr\left[y \in DI_{C_0,C_1}^{\ell_0,\ell_1} \middle| \begin{array}{l}(C_0, C_1, aux, \rho) \overset{\$}{\leftarrow} Samp(1^\lambda) \\ y \overset{\$}{\leftarrow} \mathcal{A}^{\mathcal{O}(\rho,\cdot)}(1^\lambda, 1^{d(\lambda)}, C_0, C_1, aux)\end{array}\right] = negl(\lambda).$$

Let iO be an indistinguishability obfuscator against which every PPT adversary has advantage at most negl($\lambda$)/d($\lambda$). Then, for every PPT adversary $\mathcal{A} \in$ AClass we have $$\left|Pr\left[\mathcal{A}^{\mathcal{O}(\rho,\cdot)}(1^\lambda, C_0, C_1, \tilde{C}, aux) = b \middle| \begin{array}{l}b \overset{\$}{\leftarrow} \{0, 1\} \\ (C_0, C_1, aux, \rho) \overset{\$}{\leftarrow} Samp(1^\lambda) \\ \tilde{C} \overset{\$}{\leftarrow} iO(1^\lambda, C_b)\end{array}\right] - \frac{1}{2}\right| = negl(\lambda).$$

3.0.1 Defining Almost Everywhere Extractable NIZKs

As we mention in the technical overview, almost everywhere extractable NIZKs are identity based. We recall the definition here.

Definition 16 (Identity-Based NIZK). Let $\mathcal{R}$ be an NP Relation. An Identity-Based NIZK For $\mathcal{R}$ is a Triple of Uniform PPT Algorithms (Setup, Prove, Verify) with the Following Syntax.

Setup is randomised and takes as input the security parameter and outputs a CRS σ.

Prove is randomised and takes as input the security parameter, the CRS σ, an identity id, a statement x and the corresponding witness w. The output is a proof π.

Verify is deterministic and takes as input the CRS σ, an identity id, a proof π and a statement x. The output is a bit b representing whether the statement was accepted or not.

We require that the construction satisfies completeness, namely that there exists a negligible function negl($\lambda$) such that, for every (x, w)$\in \mathcal{R}$ and identity id, $$Pr\left[Verify(\sigma, id, \pi, x) = 1 \middle| \begin{array}{l}\sigma \overset{\$}{\leftarrow} Setup(1^\lambda) \\ \pi \overset{\$}{\leftarrow} Prove(1^\lambda, \sigma, id, x, w)\end{array}\right] \geq 1 - negl(\lambda).$$

We are ready to formalise the definition of almost everywhere extractability.

Definition 17 (Almost Everywhere Extractable NIZK). An Identity-Based NIZK for the NP Relation $\mathcal{R}$ is Almost Everywhere Extractable if there Exists a Uniform PPT Algorithms SimSetup, Trap and Extract with the Following Properties No PPT adversary can distinguish between $$\left\{\sigma \middle| \sigma \overset{\$}{\leftarrow} Setup(1^\lambda)\right\} \left\{\sigma \middle| (\sigma, \tau_s, \tau_e) \overset{\$}{\leftarrow} SimSetup(1^\lambda)\right\}$$

The algorithm Extract is deterministic and, for every w=Extract($\tau_e^{id},\pi$, x), $Pr(x,w) \in \mathcal{R}_{w \neq \perp} = 1$.

There exist values l($\lambda$)$\in$ [m] and d($\lambda$) (the latter potentially superpolynomial) and a negligible function negl ($\lambda$) such that, for every identity id, $$Pr\left[\left|VPFE_{\sigma,\tau_e,id}\right| \leq d(\lambda) \middle| (\sigma, \tau_s, \tau_e) \overset{\$}{\leftarrow} NIZK.SimSetup(1^\lambda)\right] \geq 1 - negl(\lambda),$$

where $$VPFE_{\sigma,\tau_e id} := \left\{Trunc_\ell(\pi) \middle| \exists (x, r) \text{ s.t. } \begin{array}{l}NIZK.Verify(\sigma, id, \pi, x) = 1 \\ NIZK.Trap(\tau_e, id; r) = \tau_e^{id} \\ NIZK.Extract(\tau_e^{id}, \pi, x) = \perp\end{array}\right\}$$

For every probabilistic adversary $\mathcal{A}$ running in poly(A, d($\lambda$)) time, there exits a negligible function negl($\lambda$) such that, for every identity id $$Pr\left[y \in VPFE_{\sigma,\tau_e,id} \middle| \begin{array}{l}(\sigma, \tau_s, \tau_e) \overset{\$}{\leftarrow} NIZK.SimSetup(1^\lambda) \\ y \overset{\$}{\leftarrow} \mathcal{A}(1^\lambda, 1^{d(\lambda)}, \sigma, \tau_e)\end{array}\right] \leq negl(\lambda).$$

FIG. 12 illustrates an example diO game for almost everywhere extractable NIZKs

The above definition states that all prefixes of NIZKs for which verification succeeds but extraction fails lie in a set $VPFE_{\sigma,\tau_e,id}$ containing at most d($\lambda$) elements. Finding any element in this set is hard even for adversaries running in poly($\lambda$, d)-time that are provided with the extraction trapdoor $\tau_e$.

The following lemma proves that almost everywhere extractable NIZKs give indeed the property we desire: distinguishing between an obfuscated program that verifies the NIZKs and one that extracts their witness is hard.

Lemma 13. Let NIZK be an Almost Everywhere Extractable NIZK for the Relation $\mathcal{R}$. Let d($\lambda$) be the Upper-Bound on $|VPFE_{\sigma,\tau_e,id}|$. Suppose that iO is an Indistinguishability Obfuscator Against which Every PPT Adversary has Advantage at Most Negl($\lambda$)/d($\lambda$). Then, No PPT Adversary $\mathcal{A}=(\mathcal{A}_1, \mathcal{A}_2)$ can Win the Game in FIG. 12 with Non-Negligible Advantage.

FIG. 13 illustrates an example chosen-ID zero-knowledge game.

Chosen-ID Multi-Theorem Zero-Knowledge.

We now define the zero-knowledge notion required by almost everywhere extractable NIZKs: each identity id is associated with a different extraction trapdoor $\tau_e^{id}$. We want zero-knowledge to hold with respect to a given identity id* even if we leak the trapdoors corresponding to all identities id≠id*.

Definition 18 (Chosen-ID Zero-Knowledge NIZK). An Almost Everywhere Extractable NIZK (Setup, Prove, Verify) for $\mathcal{R}$ is Chosen-ID Zero-Knowledge if there Exists a Uniform PPT Algorithm SimProve Such that No PPT Adversary $\mathcal{A}$ can Win the Game in FIG. 13 with Non-Negligible Advantage.

3.1 Building an Almost Everywhere Extractable NIZK

We formalise our construction and its security properties.

FIG. 14 illustrates an example chosen-ID zero-knowledge, almost everywhere extractable NIZK Theorem 14. Suppose that Com is a Computationally Hiding, Perfectly Binding Non-interactive Commitment. Assume that the Algorithm Needs $q_2(\lambda)$ Bits of Randomness. Suppose that there Exists an Algorithm Running in Poly($\lambda$, $S(\lambda)$) Time that Breaks the Hiding property of Com with probability 1

Let IBE be an IND-ID-CPA identity-based encryption scheme that satisfies perfect correctness. Let OWF be an injective one-way function that is hard to invert even for adversaries running in poly($\lambda$, $2^{q_2(\lambda)}$, $S(\lambda)$) time. Suppose that NIWI is a perfectly sound witness-indistinguishable proof system for the relation $$\mathcal{R}_{NIWI} := \left\{ \begin{array}{c} ((mpk, v, id, c_0, c_1, x), \\ (w, r)) \end{array} \middle| \begin{array}{c} c_1 = Enc(mpk, id, w; r), (x, w) \in \mathcal{R} \\ \text{OR} \\ w = u, \ c_0 = Com(u; r), OWF(1^\lambda, u) = v \end{array} \right\}$$

Then, the construction in FIG. 14 is a chosen-ID zero-knowledge almost everywhere extractable NIZK for $\mathcal{R}$ against non-uniform PPT adversaries.

4 Distributed Samplers

Here, we give the definition of distributed samplers and our construction.

Syntax of Distributed Samplers.

We start by recalling the syntax of distributed samplers. Definition 19 (Distributed Sampler). An n-Party Distributed Sampler is a Triple of Uniform, PPT Algorithms (Setup, Gen, Sample) with the Following Syntax:

Setup is a probabilistic algorithm taking as input the security parameter. The output is a string crs.

Gen is a probabilistic algorithm taking as input the security parameter, a session identity sid, the index $i \in [n]$ of the party running the algorithm and the string crs. The output is the distributed sampler message $U_i$ of the i-th party.

Sample is a deterministic algorithm taking as input n distributed sampler messages $U_1, U_2, \ldots, U_n$, a session identity sid and the string crs. The output is a sample R.

Observe that distributed samplers are implicitly associated with a one-round protocol with CRS (the latter is generated using Setup ($1^\lambda$) producing a sample from a target distribution $\mathcal{D}$. In such protocol, all the parties $P_i$ simultaneously broadcast a distributed sampler message $$U_i \xleftarrow{\$} Gen(1^\lambda, sid, i, crs).$$

After that, everybody retrieves the output $R \leftarrow Sample(U_1, U_2, \ldots, U_n, sid, crs)$.

Notice that, compared to Abram, Scholl, and Yakoubov, we augmented the generation and sampling algorithms with a session identity. The latter can be used to restrict the context in which the distributed sampler messages can be used. For instance, it can identify the identities of the parties taking part to the protocol. If the session identity of any of the exchanged messages does not match the expected set of parties, the sampling algorithm will produce $\perp$.

4.1 Hardness-Preserving Distributed Samplers

We now present the first weakening of the original definition. The notion is called hardness-preserving distributed sampler. The name refers to the fact that this kind of distributed sampler allows compiling protocols with CRS $\Pi$ into protocols without CRS $\Pi'$ while preserving the hardness properties: if the probability of realising an attack against $\Pi$ is negligible, the probability of realising the same attack against $\Pi'$ still remains negligible.

Definition 20 (Hardness-Preserving Distributed Sampler). Let $\mathcal{D}(1^\lambda)$ be an Efficient Distribution. We Say that an n-Party Distributed Sampler is Hardness-Preserving for $\mathcal{D}(1^\lambda)$ Against AClass if, for Every PPT $\mathcal{A}$ E AClass, there Exists a Pair of PPT Non-Uniform Simulators (SimSetup $\mathcal{A}$, SimGen $\mathcal{A}$) Such that, in the Game $\mathcal{G}_{HP}$ in FIG. 15, $$Pr[\mathcal{G}^A_{HP}(1^\lambda) = 1|b = 0] = nonegl(\lambda) \Rightarrow Pr[\mathcal{G}^A_{HP}(1^\lambda) = 1|b = 1] = nonegl(\lambda).$$

FIG. 15 illustrates an example of the hardness-preserving game $\mathcal{G}_{HP}$.

4.2 Our Construction

The full description of the standard mode of our distributed sampler is in FIG. 16. In the construction, NIZK denotes an almost everywhere extractable NIZK. When we aim for security against non-uniform adversaries, NIZK will be chosen-ID zero-knowledge and almost everywhere extractable as in Def. 17. In the uniform setting instead, we will rely on simulation almost-everywhere extractability and zero-knowledge as in Def. 21. The NP relation underlying NIZK is $$\mathcal{R}_1 := \left\{ (i, hk_i, EP_i), \middle| \begin{array}{l} (K_1^{(i)}, K_2^{(i)}, u_1, u_2) := PRG(W) \\ hk_i = Hash.Gen(1^\lambda; u_1) \\ EP_i = iO(1^\lambda, EProg[K_1^{(i)}, K_2^{(i)}, i]; u_2) \end{array} \right\}$$

We also make use of a simulation-extractable NIZK, which we will denote by NIZK'. In the uniform setting, NIZK' will be $S(\lambda)$-deterministic whereas NIZK will be a-compatible for every $S(\lambda)$-computable sequence a. In other words, NIZK will be secure even if we leak the trapdoor $\tau'$ for NIZK'. The relation corresponding to NIZK' is the following.

$$\mathcal{R}_1 := \left\{ \begin{array}{c} ((i, sid, hk_i, EP_i, \\ DP_i, \pi_i, \sigma), \\ (W, \rho_1, \rho_2)) \end{array} \middle| \begin{array}{l} (K_1^{(i)}, K_2^{(i)}, u_1, u_2) := PRG(W) \\ ((i, hk_i, EP_i), W) \in \mathcal{R}_1 \\ DP_i = iO(1^\lambda, DProg[i, sid, K_2^{(i)}, EP_i, hk_i\sigma]; \rho_1) \\ \pi_i = NIZK.Prove(\sigma, (sid, i), (i, hk_i, EP_i), W; \rho_2) \end{array} \right\}$$

FIG. 16 illustrates an example of the standard mode of the lossy distributed sampler.

Theorem 15. Assume the Existence of ELFs and the Subexponential Security of Injective iO, Multi-Key FHE, Collision Resistant Hash Functions and Puncturable PRFs. If AClass Denotes the Class of Non-Uniform Adversaries, We also Assume the Existence of Simulation-extractable NIZKs and Almost Everywhere Extractable NIZKs with Unstructured CRS. If Instead AClass Denotes the Class of Uniform Adversaries, We Additionally Assume the Existence of Simulation-Extractable NIZKs and Simulation Almost Everywhere Extractable NIZKs with no CRS Then, the construction in FIG. 16 is a hardness-preserving distributed sampler for $\mathcal{D}(1^\lambda)$ with security against AClass. If AClass denotes the class of non-uniform adversaries, the construction relies on an unstructured CRS whose size is independent of $\mathcal{D}(1^\lambda)$. If AClass denotes the class on uniform adversaries, the construction does not need any CRS.

5 Almost Everywhere Extractable NIZKs without CRS in the Uniform Setting

In this Section, we Show how to Build Almost Everywhere Extractable NIZKs without CRS in the uniform setting. We design constructions that satisfy the standard definition of zero-knowledge. We achieved a stronger notion of almost everywhere extractability, which we called simulation almost everywhere extractability. This will be sufficient to build distributed samplers.

We require that, for every identity id, it is hard to find elements in $VPFE_{id}$ even if we have oracle access to the simulation oracle $SimProve(\tau_s, \bullet, \bullet)$. Clearly, the adversary is not allowed to query for a simulated proof under the identity id. We recall that in the game the adversary is allowed to run in $poly(\lambda, d(\lambda))$ time where $d(\lambda)$ denotes an upper-bound on $|VPFE_{id}|$.

Definition 21 (Simulation Almost Everywhere Extractable U-NIZK). Let $a:=(a_\lambda)_{\lambda \in N}$ Be a Sequence of Values. An Identity-Based U-NIZK (Setup, Prove, Verify) for $\mathcal{R}$ is a-compatible, Simulation Almost Everywhere Extractable if there Exists a Non-Uniform PPT Algorithm SimSetup and Uniform PPT Algorithms SimProve, Trap and Extract Such that 1. No non-uniform PPT adversary can distinguish between $$\left\{\sigma \mid \sigma \xleftarrow{\$} \text{Setup}(1^\lambda)\right\} \left\{\sigma \mid (\sigma, \tau_s, \tau_e) \xleftarrow{\$} \text{SimSetup}(1^\lambda)\right\}$$

2. The algorithm Extract is deterministic and, for every $w=\text{Extract}(\tau_e^{id}, \pi, x)$, $Pr(x,w) \in \mathcal{R} |w \neq \bot| = 1$.

3. There exist efficiently computable values $l(\lambda) \in [m]$ and $d(\lambda)$ (the latter potentially superpolynomial) and a negligible function $negl(\lambda)$ such that, for every identity id, $$Pr\left[|VPFE_{\sigma,\tau_e,id}| \le d(\lambda) | (\sigma, \tau_s, \tau_e) \xleftarrow{\$} NIZK.\text{SimSetup}(1^\lambda)\right] \ge 1 - negl(\lambda),$$

where $$VPFE_{\sigma,\tau_e,id} := \left\{ Trunc_\ell(\pi) \,\middle|\, \exists (x, r) \text{ s.t. } \begin{array}{l} NIZK.\text{Verify}(\sigma, id, \pi, x) = 1 \\ NIZK.\text{Trap}(\tau_e, id; r) = \tau_e^{id} \\ NIZK.\text{Extract}(\tau_e^{id}, \pi, x) = \bot \end{array} \right\}$$

4. Every uniform adversary $\mathcal{A}$ running in $poly(\lambda, d(\lambda))$ time wins the game in FIG. 17 with negligible probability.

FIG. 17 illustrates an example simulation almost everywhere extractable U-NIZK game.

The definition of zero-knowledge for simulation almost everywhere extractable U-NIZKs is formalised with minor changes to the notation. Indeed, since we are dealing with identity-based NIZKs, we need to augment the proof queries with identities id. The latter will be given as input to both Prove and SimProve.

We now show that Lemma 13 can be generalised to simulation almost everywhere extractable U-NIZKs. In other words, we show that, if we deal with a subexponentially secure indistinguishability obfuscator and we rely on a simulation almost everywhere extractable U-NIZK, no uniform PPT adversary can distinguish between the obfuscation of $C_0$ and $C_1$ despite the existence of differing inputs. Furthermore, indistinguishability holds even if we provide the adversary with oracle access to SimProve $(\tau_s, \bullet, \bullet)$ and we leak the extraction trapdoor $\tau_e$. We recall that the circuits $C_0$ and $C_1$ were informally defined in Section 3. Both the circuits take as input m statements and m NIZKs proving the validity of the latter. While $C_0$ simply verifies the NIZKs and outputs a function of the statements, $C_1$ tries to extract all the witnesses. In case of a failure, $C_1$ outputs $\bot$, otherwise, it performs the same operations as $C_0$.

Lemma 16. Let $a:=(a_\lambda)_{\lambda \in \leftarrow}$ be a Sequence of Values. Let NIZK be an a-Disclosed, Simulation Almost Everywhere Extractable U-NIZK for the Relation $\mathcal{R}$. Let $d(\lambda)$ be the Upper-Bound on $|VPFE_{\sigma,\tau_e,id}|$. Suppose that iO is an Indistinguishability Obfuscator Against Which Every PPT Adversary has Advantage at Most $negl(\lambda)/d(\lambda)$. Then, No Uniform PPT adversary A can win the game in FIG. 18 with non-negligible advantage.

FIG. 18 illustrates an example diO game for simulation almost everywhere extractable U-NIZKs.

5.1 Building Simulation Almost Everywhere Extractable U-NIZKs without Crs

We now present a simulation almost everywhere extractable U-NIZK without CRS. The construction is based on a perfectly sound NIWI, a challengeless labelled one-way function and two commitment schemes. The first one is perfectly binding and secure against non-uniform adversaries, the second one is an extractable U-commitment.

Each proof includes two commitments $c_0$ and $c_1$. The first one hides the value 0, whereas the second one, which is extractable, hides the witness w. We use the NIWI to prove that either $c_1$ hides a witness for our statement, or $c_0$ is a commitment to a value $u^{id}$ such that the pair $(u^{id}, id)$ is accepted by the challengeless labelled one-way function. We recall that id is the identity under which we prove the validity of our statement. Observe that the soundness trapdoor coincides with the trapdoor of the labelled one-way function. The extraction trapdoor, instead, coincides with the trapdoor of the extractable commitment scheme.

Ensuring simulation almost everywhere extractability. Proving that our construction is zero-knowledge is straightforward. The main challenge is, however, proving simulation almost everywhere extractability.

We would like that, in every valid NIZK where extraction fails, the commitment $c_0$ hides a value accepted by the labelled one-way function. In order to ensure this, we rely on a perfectly correct extractable U-commitment. In other words, we are sure that if $c_1$ hides the witness, the extraction always succeeds. By the perfect soundness of the NIWI, we are also sure that if $c_1$ does not hide the witness, then $c_0$ must hide a value accepted by the labelled one-way function in conjunction with id. If we consider a $B(\lambda)$-bounded labelled one-way function, the number of elements in $\text{VPFE}_{\sigma,\tau_e,id}$ is at most $d(\lambda):=B(\lambda)\cdot 2^{q(\lambda)}$ where $q(\lambda)$ denotes the length of the randomness needed by the perfectly binding commitment. (We can assume that $q(\lambda)$ is independent of the length of the committed value.)

In order to achieve the last property of almost everywhere extractability, we require that the labelled OWF is at least $d(\lambda)$-secure. Observe that if we adopt a subexponentially secure injective, labelled OWF, by choosing a sufficiently large security parameter for the construction, we can always ensure this. We also consider a perfectly binding commitment scheme in which the hidden message can be retrieved in poly($\lambda$, $d(\lambda)$) time. In this way, we are sure that if an adversary can find an element in $\text{VPFE}_{\sigma,\tau_e,id}$ in poly($\lambda$, $d(\lambda)$) time, it can also break the labelled one-way function. Notice that having access to simulated proofs under identities different from id does not help in finding elements in $\text{VPFE}_{\sigma,\tau_e,id}$.

Independently secure extractable commitments and labelled one-way functions. A minor issue we encounter in the blueprint above is that the proof of zero-knowledge would require that the extraction trapdoor is hard to retrieve even if we leak the soundness trapdoor. On the other hand, the proof of simulation almost everywhere extractability would require the symmetric relation: the soundness trapdoor is hard to retrieve even when the extraction trapdoor is known. Similarly to what we did in the first construction of simulation-sound U-NIZK, we therefore require that the security of the extractable U-commitment is "independent" of the security of the labelled one-way function.

Definition 22 (Independently Secure Extractable Commitments and Labelled OWFs). Let (ExCom, Extract) be a Non-Interactive, Extractable U-Commitment and Let (CLOWF, Derive) be a Challengeless, Labelled One-Way Function. Let $\tau_e$ be the Trapdoor for ExCom. Similarly, Let $\tau_s$ be the Trapdoor for CLOWF. We Say that ExCom and CLOWF are Independently Secure if.

For every pair of uniform PPT algorithms ($\mathcal{A}_1$, $\mathcal{A}_2$), $$Pr\left[\mathcal{A}_2(\psi, c) = b \middle| \begin{array}{l} b \xleftarrow{\$} \{0, 1\} \\ (m_0, m_1, \psi) \xleftarrow{\$} \mathcal{A}_1(\mathbb{1}^\lambda, \tau_s) \\ c \xleftarrow{\$} ExCom(\mathbb{1}^\lambda, m_b) \end{array}\right] = negl(\lambda).$$

For every uniform PPT algorithm $\mathcal{A}$, $$Pr\left[id \notin Q, CLOWF(\mathbb{1}^\lambda, u^{id}, id) = 1 \middle| (id, u^{id}) \xleftarrow{\$} \mathcal{A}^{Derive(\mathbb{1}^\lambda, \tau_s, \cdot)}(\mathbb{1}^\lambda, \tau_e)\right] = negl(\lambda),$$

where Q denotes the set of identities queried by $\mathcal{A}$ to Derive ($\mathbb{1}^\lambda$, $\tau_s$, •).

Let $S_1(\lambda)$, $S_2(\lambda)$ be functions of the security parameter. We say that ExCom and CLOWF are ($S_1$, $S_2$)-independently secure if the above properties hold even if $\mathbb{1}^\lambda$ runs in poly($\lambda$, $S_1(\lambda)$) time and $\mathcal{A}_1$ and $\mathcal{A}_2$ run in poly($\lambda$, $S_2(\lambda)$) time.

One way we can obtain pairs of independently secure challengeless labelled one-way functions and extractable U-commitments is by moving to a post-quantum world: by appropriately parametrising security, we can make $\tau_s$ harder to find than $\tau_e$ in a classical world. In a quantum world, instead, we can flip the relation: while finding $\tau_e$ will retain its hardness, $\tau_s$ will be easily retrievable. In other words, it is sufficient to take a post-quantumly secure non-interactive, extractable U-commitment and a post-quantumly broken challengeless labelled one-way function (or vice versa). This approach has clearly the disadvantage that the resulting pair is not secure against quantum adversaries, however, there may be other solutions that do not suffer from this issue.

Formalising the scheme. We rely on a perfectly binding non-interactive commitment scheme Com. We assume that Com requires $q(\lambda)$ bits of randomness. We also assume that the value hidden in a commitment can be retrieved with probability 1 in uniform poly($\lambda$, $2^{q(\lambda)}$) time.

Let $B(\lambda)$ and $T(\lambda)$ be functions of the security parameter such that $T(\lambda) \ll B(\lambda) \cdot 2^{q(\lambda)}$. We make use of a non-interactive extractable commitment scheme ExCom with perfect correctness (we use $q'(\lambda)$ to denote the length of the randomness it needs). We denote the extraction trapdoor by $\tau_e$. We also use of an $B(\lambda)$-bounded challengeless labelled one-way function CLOWF. We denote the corresponding trapdoor by $\tau_s$. We require that ExCom and CLOWF are (T, $2^q \cdot B$)-independently secure.

Finally, let NIWI be a perfectly sound, witness indistinguishable proof system for the relation $\mathcal{A}_{NIWI}$ described below $$\left\{((id; c_0, c_1, x), (w, r)) \middle| \begin{pmatrix} (x, w) \in \mathcal{R} \\ c_1 = ExCom(\mathbb{1}^\lambda, w; r) \end{pmatrix} \text{ OR } \begin{pmatrix} CLOWF(\mathbb{1}^\lambda, w, id) = 1 \\ c_0 = Com(\mathbb{1}^\lambda, w; r) \end{pmatrix}\right\}$$

FIG. 19 illustrates an example of a simulation almost everywhere extractable U-NIZK without CRS.

Theorem 17. Let $q(\lambda)$, $T(\lambda)$ and $B(\lambda)$ be Functions of the Security Parameter where $T(\lambda) \ll B(\lambda) \cdot 2^{q(\lambda)}$. Let a be any $T(\lambda)$-Computable Sequence. Assume the Existence of Non-Interactive Witness-Indistinguishable Proofs without CRS and a Perfectly Binding Non-Interactive Commitment Scheme. Suppose that the Latter Uses $q(\lambda)$ Bits of Randomness and it is Possible to Retrieve the Committed Values with Probability 1 in Uniform Poly($\lambda$, $2^{q(\lambda)}$) Time. Assume also the Existence of a Perfectly Correct, Non-Interactive, Extractable U-Commitment and a $B(\lambda)$-Bounded Challengeless, Labelled One-Way Function that are (T, B·$2^q$)-Independently Secure. Then, the Construction in FIG. 19 is an a-Disclosed Multi-Theorem Zero-Knowledge, Simulation Almost Everywhere Extractable U-NIZK without CRS for $\mathcal{R}$.

Proof. Completeness follows immediately from the completeness of NIWI.

Claim 1. The Construction in FIG. 19 is a-Disclosed Multi-Theorem Zero-Knowledge Against Uniform PPT Adversaries.

Proof of the claim. Let $M(\lambda)$ be a polynomial upper-bounding the number of tuples ($id_i$, $x_i$, $w_i$) queried by $\mathcal{A}$. Since $\mathcal{A}$ is PPT, we know that M exists. Let $\pi_i$ denote the answer to the i-th query.

For every $i \in [M] \cup \{0\}$, we define Hybrid i as the hybrid in which, for every $j \leq i$, we generate $\pi_j$ using SimProve($\tau_s$, $id_j$, $x_j$). For very $j > i$ instead, we generate $\pi_j$ using Prove ($\mathbb{1}^\lambda$, $id_j$, $x_j$, $w_j$).

Notice that Hybrid 0 is identical to the zero-knowledge game when b=0. Hybrid M is instead identical to the zero-knowledge game when b=1. In order to prove our claim, it is sufficient to show that no uniform PPT adversary can distinguish between Hybrid (i−1) and Hybrid i for a randomly sampled $$i \xleftarrow{\$} [M]$$

We rely on a sequence of indistinguishable subhybrids.
Hybrid' 0. This hybrid coincides with Hybrid (i−1) for $$i \xleftarrow{\$} [M]$$

Hybrid' 1. In this hybrid, we change the proof $\pi_i$. In particular, instead of generating a commitment $c_0$ of 0, we commit to $$u^{id_i} \xleftarrow{\$} \text{Derive}(\tau_s, id_i).$$

All the rest remains as in Hybrid' 0.

This hybrid is indistinguishable from the previous one by the hiding property of Com. Since Com is secure against non-uniform adversaries, we can assume that $\tau_s$ and $a_\lambda$ are given to the adversary $\mathcal{B}$ in the reduction as part of its advice string. So, the adversary $\mathcal{B}$ will simply sample i $\xleftarrow{\$}$ [M] and simulate the zero-knowledge game as in Hybrid' 0 to an internal copy of $\mathcal{A}$. At the i-th query, $\mathcal{B}$ will send the pair (0, $u^{id_i}$) to its challenger and use the commitment it receives as part of the proof $\pi_i$. The adversary $\mathcal{B}$ terminates the execution outputting the same bit as $\mathcal{A}$. Notice that if $\mathcal{A}$ distinguishes between Hybrid' 0 and Hybrid' 1, then $\mathcal{B}$ break the hiding property of Com.

Hybrid' 2. In this hybrid, we change again the proof $\pi_i$. In particular, instead of using $w_i$ as witness for NIWI, we use $u^{id_i}$ and the randomness used to commit to it. This hybrid is indistinguishable from the previous one by the witness indistinguishability of NIWI.

Notice that NIWI is secure against non-uniform adversaries so, in the reduction, we can assume that the adversary is given $\tau_s$ and $a_\lambda$ as part of its advice string. The adversary we construct, denoted by $\mathcal{B}$, starts its execution sampling a random $$i \xleftarrow{\$} [M].$$

Then it simulates the game as in Hybrid' 1 to an internal copy of $\mathcal{A}$. It deviates from the game at the i-th Prove query. In particular, after generating $c_0$ and $c_1$ as usual, it queries (id$_i$, $c_0$, $c_1$, $x_i$) along with the witnesses ($w_i$, $r_1$) and ($u^{id_i}$, $r_0$) to the NIWI challenger. Here, $r_0$ and $r_1$ denote the randomness used for the generation of $c_0$ and $c_1$ respectively. The answer $\pi'$ is included in the proof requested by $\mathcal{A}$. At the end of its execution, $\mathcal{B}$ outputs the same bit as $\mathcal{A}$. If $\mathcal{A}$ succeeds in distinguishing, $\mathcal{B}$ succeeds too.

Hybrid' 3. In this hybrid, in the i-th Prove query, instead of committing to $w_i$ using ExCom, we commit to 0. This hybrid is indistinguishable from the previous one by the first property of (T, B·$2^q$)-independent security of ExCom and CLOWF.

In the reduction, we build a uniform adversary $\mathcal{B}$. The adversary $\mathcal{B}$ samples a random $$i \xleftarrow{\$} [M]$$

and retrieves $\tau_s$ and $a_\lambda$. The former is given by the challenger, the latter is computed in T($\lambda$)-uniform polynomial time. Then, $\mathcal{B}$ simulates the game as in Hybrid' 2 to an internal copy of $\mathcal{A}$. In the i-th Prove query, $\mathcal{B}$ deviates from the protocol. In particular, it queries $w_i$ and 0 to its challenger and uses the answer $c_1$ to generate the proof $\pi_i$. At the end of its execution, $\mathcal{B}$ outputs the same bit as $\mathcal{A}$. If $\mathcal{A}$ succeeds in distinguishing, $\mathcal{B}$ succeeds too.

Observe that Hybrid' 3 is identical to Hybrid i for a random $$i \xleftarrow{\$} [M]$$

This ends the proof of the claim.

Claim 2. The Construction in FIG. 19 is an a-Disclosed Simulation Almost Everywhere Extractable U-NIZK for $\mathcal{R}$.

Proof of the claim. The first two properties of simulation almost everywhere extractable NIZKs are trivial.

As for the third property, we observe that since NIWI is perfectly sound and ExCom perfectly correct, in all proofs $\pi=(c_0, c_1, \pi')$ for which there exists a such that Verify (id, $\pi$, x)=1 but Extract($\tau_e^{id}$, $\pi$, x)=$\bot$, $c_0$ is a commitment to a value $u^{id}$ such that CLOWF($\mathbb{1}^\lambda$, $u^{id}$, id)=1. The number of such commitments is at most B($\lambda$)·$2^{q(\lambda)}$ where q($\lambda$) denotes the length of the randomness needed by Com. We conclude that the third property holds with relation to l($\lambda$) denoting the position of the last bit of $c_0$, $$d(\lambda) := B(\lambda) \cdot 2^{q(\lambda)}$$

and $$VPFE_{\sigma,\tau_e,id} := \{Com(\mathbb{1}^\lambda, u^{id};, r) | r \in \{0, 1\}^{q(\lambda)}, CLOWF(\mathbb{1}^\lambda, u^{id}, id) = 1\}.$$

We focus on the last property. Suppose that there exists a uniform adversary $\mathcal{A}$ running in poly($\lambda$, d($\lambda$)) time that, even if knowing $\tau_e$ and having oracle access to SimProve, it can derive a pair (id, y) where y$\in$ VPFE$_{\sigma,\tau_e,id}$ and id$\notin$ Q with non-negligible probability. We recall that Q denotes the set of identities queried to SimProve.

We use $\mathcal{A}$ to build a uniform adversary $\mathcal{B}$ that breaks the second property of the (T, B·$2^q$)-independent security of ExCom and CLOWF. The adversary $\mathcal{B}$ runs in poly(A, d($\lambda$)) time. It starts its execution deriving $\tau_e$ and $a_\lambda$, the operation requires T($\lambda$) time ($\tau_e$ is given by the challenger). Then, it simulates the almost-everywhere extraction game as in FIG. 17 to an internal copy of $\mathcal{A}$. In every Prove query, $\mathcal{B}$ relays the corresponding identity id' to its challenger, it uses the answer $u^{id'}$ to generate the simulated proof. When the adversary $\mathcal{A}$ outputs a pair (id, y) where id$\notin$Q, $\mathcal{B}$ retrieves the value hidden in the commitment y and outputs it. Breaking y requires poly($\lambda$, $2^{q(\lambda)}$) time. Observe that $\mathcal{B}$ wins with non-negligible probability. This contradicts the security of challengeless labelled one-way function.

System Implementations

According to some embodiments, a method for generating a common reference string for use by multiple parties involves executing a generation algorithm locally on computerized processors at a set of parties. This generation algorithm takes as input a description of a sampler D and outputs a message for each party in the set. The generation algorithm operates by creating two respective codes for each of an encryption program EP and a decryption program DP. It also executes a procedure PROVE to create a non-interactive zero knowledge (NIZK) proof $\pi$, which proves that EP was created correctly. Additionally, the generation algorithm creates a NIZK proof $\pi'$ that EP, DP, and $\pi$ were jointly created correctly. The output generated by the algorithm, which is determined in part based on EP, DP, $\pi$, and $\pi'$, serves as the message for each party.

Each party in the set then publishes their respective messages to a public domain, making them accessible to all other parties. Subsequently, each party accesses the messages from the other parties in the set from the domain. A derivation algorithm is executed locally at each party of the set, which derives a common reference string from the set of messages by combining them. This derivation algorithm further involves retrieving the messages published by the other parties from the public domain. From each message, the algorithm extracts EP, DP, $\pi$, and $\pi'$. A procedure VER is executed to verify each of the NIZK proofs $\pi'$ received from each party.

The derivation algorithm then combines all of the EP codes and all of the NIZK proofs $\pi$ obtained from all of the parties to generate a combined parameter set. For each program DP from each party of the set, the respective DP program is executed on the combined parameter set to generate a combined output d. Finally, a final sample R is generated as the common reference string derived from the combined output d, and this common reference string is stored in a computerized storage device.

More broadly, the present disclosure relates to the field of cryptography, and more specifically, to the use of common reference strings in various cryptographic operations. In some aspects, the disclosure provides a detailed understanding of different types of common reference strings, their roles, characteristics, and the contexts in which they are used. This understanding is integral to the security and functionality of cryptographic systems and is beneficial for advanced studies and applications in cryptography. Non-limiting examples of applications of common reference strings are provided herein.

In some cases, the disclosure can be applied to the use of secret keys in symmetric cryptography, where a secret bit string is used to both encrypt and decrypt data. The security of the symmetric encryption system relies on the secrecy of this secret bit string, which is typically distributed securely and kept confidential to ensure the integrity and confidentiality of the communication.

In other aspects, the disclosure can be applied to public and private keys in asymmetric cryptography. Here, two different but mathematically related keys are used: a public and a private one. The public one can be distributed openly and is used for encrypting messages or verifying signatures, while the private one is kept secret and used for decrypting messages or signing data.

Further, the disclosure can be applied to the use of initialization vectors (IVs) in block cipher modes of operation. The IV is a nonce (a number used once) that is used in conjunction with a secret bit string to ensure that the same plaintext encrypts to different ciphertexts each time, thus enhancing security.

In some cases, the disclosure can be applied to salts in the context of password storage and hash functions. A salt is a random value added to the input of a hash function to ensure that identical passwords result in different hashes, thereby defending against attacks that utilize precomputed hash values, such as rainbow table attacks.

Additionally, the disclosure can be applied to nonces, which are numbers that are not repeated under the same cryptographic keys. Nonces are particularly useful in preventing replay attacks and ensuring the freshness of communications in various cryptographic protocols.

In other aspects, the disclosure can be applied to cryptographic seeds in pseudorandom number generators (PRNGs). These seeds provide the initial input for the PRNGs, which are then used to generate cryptographic variables such as keys, IVs, and nonces. The unpredictability of the output from PRNGs, which is dependent on the randomness of the seed, is a cornerstone of cryptographic security.

In other aspects, the disclosure can be applied to parameters in the Diffie-Hellman (DH) protocol. These parameters include a prime number and a base, which are used along with the private and public keys to securely exchange a secret common reference string over an insecure channel. This secret common reference string can then be used as symmetric encryption and decryption keys by the parties involved.

Referring to FIG. 20, a system for generating a common reference string for use by multiple parties is depicted. The system includes multiple parties, each equipped with a Generation Module and a Derivation Module. The Generation Modules may be responsible for creating messages based on a description of a sampler, while the Derivation Modules may be tasked with deriving the common reference string from the set of messages. All parties may be interconnected through a network that allows for the publication and retrieval of messages to and from a Public Domain, which may act as a central repository. The flow of information is depicted by arrows, indicating the process from message generation, through public sharing, to the derivation of the common reference string.

In some aspects, the method may involve executing a generation algorithm locally on computerized processors at a set of parties. The generation algorithm may receive a description of a sampler D as input and output a message for each party in the set. The generation algorithm may operate by creating two respective codes for each of an encryption program EP and a decryption program DP. In some cases, the method may involve executing a procedure PROVE to create a non-interactive zero knowledge (NIZK) proof $\pi$, proving that EP was created correctly. The method may also involve creating a NIZK proof $\pi'$ that EP, DP, $\pi$ were jointly created correctly.

In some cases, each party of the set of parties may publish their respective messages to a public domain. This publication process may allow for the messages to be accessible by all parties involved, facilitating the sharing of information and the derivation of the common reference string.

In some aspects, each party of the set of parties may access the messages from the other parties in the set from the domain. This access may be facilitated by the network that interconnects all parties and the Public Domain. The messages may be retrieved and used in subsequent cryptographic operations, such as the derivation of the common reference string.

In some cases, a derivation algorithm may be executed locally at each party of the set of parties. The derivation algorithm may derive a common reference string from the set of messages by combining the messages. This combination process may involve various cryptographic operations, such as hashing or encryption, to generate a common reference string that is secure and consistent across all parties.

In some aspects, the distributed sampler may satisfy a specific security property. This security property may ensure that if a protocol that uses a sample R sampled from D is secure, then the protocol is also secure if R is sampled from the distributed sampler. This property may provide an additional layer of security and reliability to the cryptographic operations involving the common reference string.

In some cases, the NIZK may have specific properties related to the procedures PROVE, VER, and EXTRACT. These properties may include the ability to create and verify non-interactive zero knowledge proofs, as well as the ability to extract witnesses for NP statements. These properties may enhance the security and integrity of the cryptographic operations involving the common reference string.

In other aspects, the procedure PROVE may execute specific steps to create a commitment c0, an extractable commitment c1, and a non-interactive witness indistinguishable proof $\pi^*$. These steps may involve various cryptographic operations, such as hashing or encryption, and may contribute to the generation of the messages by the Generation Modules. The outputs of the procedure PROVE, including the commitments and the proof, may be included in the messages published to the Public Domain and used in the derivation of the common reference string.

In some aspects, the derivation algorithm at each party in the set may further comprise retrieving from the public domain the messages published by the other parties. This retrieval process may involve accessing the Public Domain through the network and downloading or otherwise obtaining the messages. The retrieved messages may then be used in subsequent operations of the derivation algorithm.

In some cases, from each message from the other parties, the derivation algorithm may extract EP, DP, $\pi$, $\pi'$. This extraction process may involve parsing the messages or performing other operations to identify and separate the components of the messages. The extracted components may then be used in subsequent operations of the derivation algorithm.

In other aspects, the derivation algorithm may execute a procedure VER to verify each of the NIZK proofs $\pi'$ received from each party. This verification process may involve applying the procedure VER to each proof $\pi'$, checking whether the proof was created correctly and whether it corresponds to a valid statement. If the proof is verified successfully, it may be used in subsequent operations of the derivation algorithm. If the proof fails the verification, it may be discarded or an error may be raised.

In some cases, at least one or the sole entity is trusted. This trust may be established through various means, such as through a prior agreement between the parties, through a certification process, or through other mechanisms. The trusted entity or entities may play a special role in the generation and derivation of the common reference string, such as by generating a particular component of the messages or by performing a particular operation in the derivation algorithm.

In other aspects, each party of the set of parties may publish their respective messages to a public domain. This publication process may involve transmitting the messages over the network to the Public Domain, where they may be stored and made accessible to all parties. The messages may be published in a manner that preserves their integrity and confidentiality, such as by encrypting them or by using secure transmission protocols.

In some cases, each party of the set of parties may access the messages from the other parties in the set from the domain. This access process may involve connecting to the Public Domain through the network, retrieving the messages, and downloading or otherwise obtaining them. The accessed messages may then be used in the derivation of the common reference string.

In other aspects, the derivation algorithm at each party in the set may retrieve from the public domain the messages published by the other parties. This retrieval process may involve accessing the Public Domain through the network, identifying the messages published by the other parties, and downloading or otherwise obtaining them. The retrieved messages may then be used in subsequent operations of the derivation algorithm.

Figure 21:
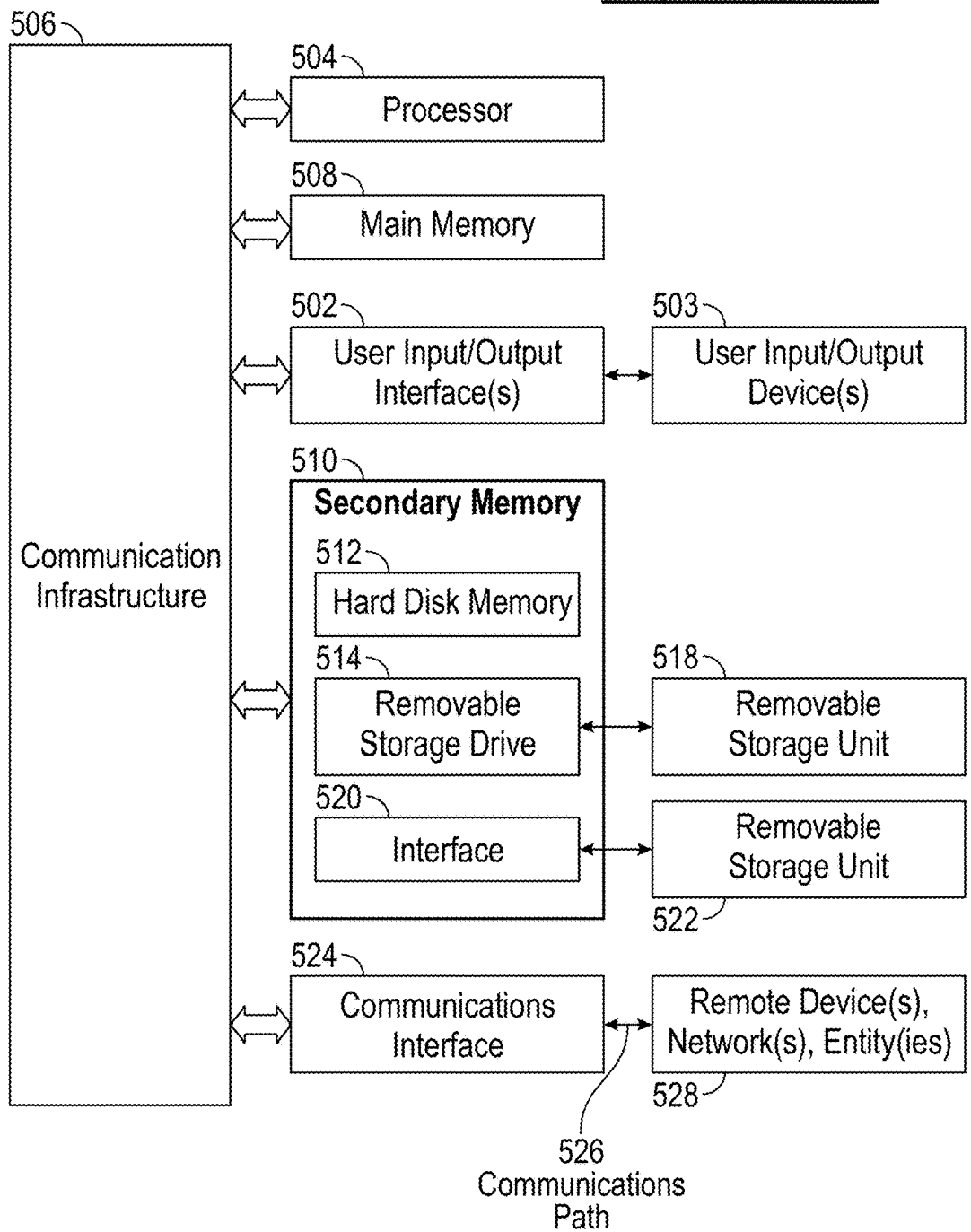
FIG. 21 depicts a computer system with various components for data processing and communication, according to aspects of the present disclosure.

Referring to FIG. 21, a block diagram of a computer system 500 is depicted. The computer system 500 may include a processor 504, which may be configured to execute a generation algorithm locally on computerized processors at a set of parties. The generation algorithm may receive a description of a sampler D as input and output a message for each party in the set. The processor 504 may be connected to a communication infrastructure 506, which may facilitate communication between the processor 504, main memory 508, secondary memory 510, user input/output interfaces 502, and a communications interface 524.

The user input/output interfaces 502 may be linked to user input/output devices 503, allowing for user interaction with the computer system 500. In some cases, the generation algorithm may operate by creating two respective codes for each of an encryption program EP and a decryption program DP. The secondary memory 510 may encompass a hard disk memory 512 and a removable storage drive 514, which may interface with a removable storage unit 518 through an interface 520.

A removable storage unit 522 is also depicted. The communications interface 524 may provide connectivity to remote devices, networks, or entities 528 via a communications path 526, enabling the computer system 500 to communicate with external systems and networks. In some aspects, the generation algorithm may execute a procedure PROVE to create a non-interactive zero knowledge (NIZK) proof $\pi$, proving that EP was created correctly.

In some cases, the generation algorithm may create a NIZK proof $\pi'$ that EP, DP, $\pi$ were jointly created correctly. The generation algorithm may generate an output determined in part based on EP, DP, $\pi$, and $\pi'$ as the message for each party. This output may be stored in the main memory 508 or the secondary memory 510 for further processing or transmission.

In some aspects, the computer system 500 may execute a derivation algorithm locally at each party of the set of parties. The derivation algorithm may derive a common reference string from the set of messages by combining the messages. This combination process may involve various cryptographic operations, such as hashing or encryption, to generate a common reference string that is secure and consistent across all parties.

In some cases, from each message from the other parties, the derivation algorithm may extract EP, DP, π, π'. This extraction process may involve parsing the messages or performing other operations to identify and separate the components of the messages. The extracted components may then be used in subsequent operations of the derivation algorithm.

In other aspects, the derivation algorithm may execute a procedure VER to verify each of the NIZK proofs π' received from each party. This verification process may involve applying the procedure VER to each proof π', checking whether the proof was created correctly and whether it corresponds to a valid statement. If the proof is verified successfully, it may be used in subsequent operations of the derivation algorithm. If the proof fails the verification, it may be discarded or an error may be raised.

In some cases, the derivation algorithm may combine all of the EP codes and all of the NIZK proofs π obtained from all of the parties to generate a combined parameter set. This combination process may involve various cryptographic operations, such as hashing or encryption, to generate a combined parameter set that is secure and consistent across all parties.

In other aspects, for each program DP from each party of the set, the derivation algorithm may execute the respective DP program on the combined parameter set to generate a combined output d. This execution process may involve running the DP program with the combined parameter set as input, performing various cryptographic operations to generate a combined output d. The combined output d may then be used in subsequent operations of the derivation algorithm, such as in the generation of the common reference string.

In some aspects, the derivation algorithm may generate a final sample R as the common reference string derived from the combined output d. This generation process may involve various cryptographic operations, such as hashing or encryption, to generate a common reference string that is secure and consistent across all parties. The final sample R may then be stored in a computerized storage device, such as the secondary memory 510 or a removable storage unit 518 of the computer system 500. This storage process may involve writing the common reference string to the storage device in a manner that preserves its integrity and confidentiality. The stored common reference string may then be used in subsequent cryptographic operations, such as in the encryption or decryption of data, the verification of digital signatures, or the generation of cryptographic keys.

Figure 22:
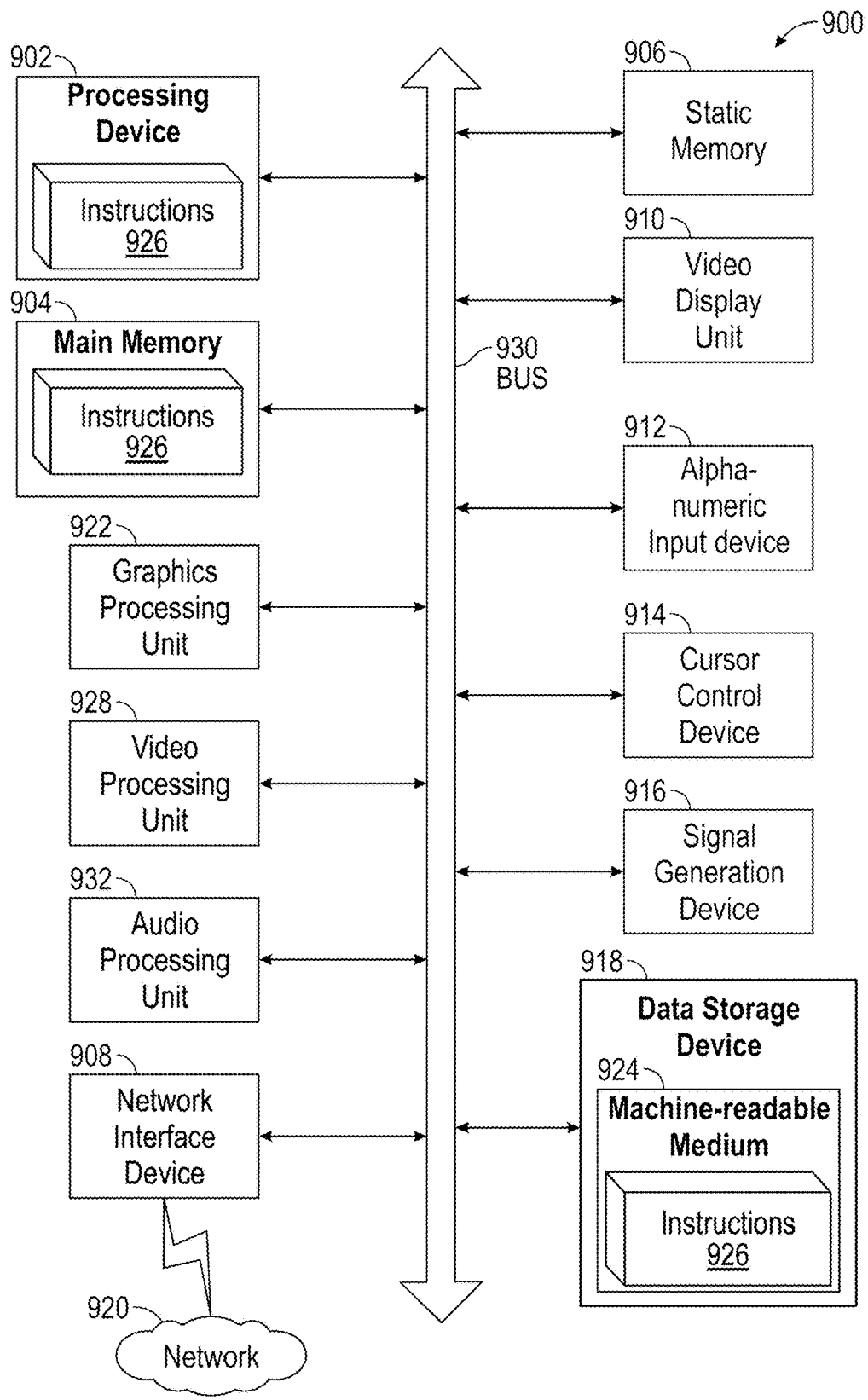
FIG. 22 shows a computer system with specific devices for user interaction, data processing, and network connectivity, according to aspects of the present disclosure.

Referring to FIG. 22, a block diagram of a computer system 900 is depicted. The computer system 900 may include a processing device 902 that executes executable instructions 926 stored in main memory 904 and static memory 906. The processing device 902 may be connected to a network interface device 908, which provides connectivity to an external network 920. An alphanumeric input device 912 and a cursor control device 914 may allow for user interaction, while a signal generation device 916 may facilitate the output of signals. The system also includes a data storage device 918, which houses a machine-readable medium 924 containing executable instructions 926. A graphics processing unit 922 and a video processing unit 928 may be responsible for rendering images, which are displayed on a video display unit 910. Additionally, an audio processing unit 932 may process audio signals. All these components may be interconnected via a communication bus 930.

In some aspects, the processing device 902 may be configured to execute various algorithms and procedures related to the generation and derivation of a common reference string. These algorithms and procedures may include, for example, a generation algorithm that receives a description of a sampler D as input and outputs a message for each party in a set of parties, and a derivation algorithm that derives a common reference string from a set of messages by combining the messages. The executable instructions 926 stored in the main memory 904 and the static memory 906 may include instructions for implementing these algorithms and procedures.

In some cases, the network interface device 908 may provide connectivity to an external network 920, allowing the computer system 900 to communicate with other systems or entities. This communication may involve, for example, the publication of messages to a public domain, and the retrieval of messages from the public domain. The network interface device 908 may support various communication protocols and standards to ensure secure and reliable communication.

In other aspects, the alphanumeric input device 912 and the cursor control device 914 may allow for user interaction with the computer system 900. This interaction may involve, for example, the input of parameters or settings related to the generation and derivation of the common reference string, or the initiation or termination of these processes.

In some cases, the signal generation device 916 may facilitate the output of signals, which may include, for example, signals indicating the status or progress of the generation and derivation processes, or signals representing the generated common reference string or the messages used in these processes.

In other aspects, the data storage device 918 may house a machine-readable medium 924 containing executable instructions 926. These instructions may include instructions for implementing the generation and derivation algorithms, as well as other algorithms and procedures related to the generation and derivation of the common reference string. The data storage device 918 may provide persistent storage for these instructions, ensuring their availability even when the computer system 900 is powered off or restarted.

In some cases, the graphics processing unit 922 and the video processing unit 928 may be responsible for rendering images, which may include, for example, graphical representations of the common reference string, the messages used in the generation and derivation processes, or the status or progress of these processes. These images may be displayed on a video display unit 910, providing a visual interface for users to interact with the computer system 900 and monitor the generation and derivation processes.

In other aspects, the audio processing unit 932 may process audio signals, which may include, for example, audio alerts or notifications related to the generation and derivation processes, or audio representations of the common reference string or the messages used in these processes. These audio signals may provide an auditory interface for users to interact with the computer system 900 and monitor the generation and derivation processes.

In some cases, all the components of the computer system 900 may be interconnected via a communication bus 930. This bus may facilitate the exchange of data and control signals between the components, enabling coordinated operation of the components in the generation and derivation of the common reference string.

A number of implementations have been described. Nevertheless, it will be understood that various modifications may be made without departing from the spirit and scope of the disclosure. Accordingly, other implementations are within the scope of the following claims.

The invention claimed is:

1. A method for generating a common reference string for use by multiple parties, the method comprising:
   executing a generation algorithm locally on computerized processors at a set of parties, which generation algorithm receives as input a description of a sampler D and outputs a message for each party in the set, wherein the generation algorithm operates by:
   creating two respective codes for each of encryption program EP and decryption program DP;
   executing a procedure PROVE to create a non-interactive zero knowledge (NIZK) proof $\pi$, the proof $\pi$ proving that that EP was created correctly;
   creating a NIZK proof $\pi'$ that EP, DP, $\pi$ were jointly created correctly;
   generating an output determined in part based on EP, DP, $\pi$, and $\pi'$ as the message for each party;
   each party of the set of parties publishing their respective messages to a public domain;
   each party of the set of parties accessing the messages from the other parties in the set from the public domain; and
   executing a derivation algorithm locally at each party of the set of parties, which derivation algorithm derives a common reference string from the set of messages by combining the messages;
   wherein the derivation algorithm at each party in the set further comprises:
   retrieving from the public domain the messages published by the other parties;
   from each message from the other parties, extracting EP, DP, $\pi$, $\pi'$;
   executing a procedure VER to verify each of the NIZK proofs $\pi'$ received from each party;
   combining all of the EP codes and all of the NIZK proofs $\pi$ obtained from all of the parties in the set to generate a combined parameter set;
   for each program DP from each party of the set, executing the respective DP program on the combined parameter set to generate a combined output d; and
   generating a final sample R as the common reference string derived from the combined output d and storing the common reference string in a computerized storage device.

2. The method of claim 1, wherein the distributed sampler satisfies the following security property: if a protocol that uses a sample R sampled from D is secure, then the protocol is also secure if R is sampled from the distributed sampler as in claim 1, assuming at least one of the entities generating R is trusted.

3. The method of claim 1, wherein the NIZK has properties of:
   the procedure PROVE, which takes as input an NP statement x, an identity i, and witness w demonstrating that a is a true statement, and creates either the proof $\pi$ or $\pi'$;
   a procedure VER, which takes as input an NP statement x, an identity i, and the proof $\pi$ or $\pi'$, and either accepts or rejects by:
   if $\pi$ or $\pi'$ was created by procedure PROVE, then VER is guaranteed to accept;
   if x is a false statement, then no efficient algorithm can compute i and $\pi$ or $\pi'$ such that VER accepts x, i, $\pi$ or x, i, $\pi'$, wherein this holds true even if an adversary is provided with multiple proofs of false statements using identities in set Q, as long as i$\notin$Q; and
   a procedure EXTRACT, which takes as input the proof $\pi$ or $\pi'$, statement x, and a trapdoor $\tau_i$ for an identity i and outputs a witness w for the statement x.

4. The method of claim 3, wherein the procedure PROVE executes:
   creating a commitment $c_0$ to an arbitrary string;
   creating an extractable commitment $c_1$ to the witness w;
   creating a non-interactive witness indistinguishable proof $\pi^*$ of a statement $x^*$ that either of the following are true:
   w is a valid witness that a is true and $c_1$ is a valid commitment to the witness w; or
   CLOWF(w, i)=1 and $c_0$ is a valid commitment to w, where CLOWF is a challengeless labelled one-way function; and
   outputting the proof $\pi$ as $\pi=(c_0, c_1, \pi^*)$.

5. The method of claim 4, wherein a procedure VER is configured for verifying that $\pi^*$ is a valid non-interactive witness indistinguishable proof of the statement $x^*$.

6. The method of claim 5, wherein a procedure EXTRACT is configured to:
   execute procedure VER to obtain outcome bit b;
   if b=0, then EXTRACT outputs a special symbol $\bot$;
   extract w from the extractable commitment $c_1$ and the trapdoor $\tau_i$;
   if w is not a valid witness for x, then output $\bot$; and
   if b=1 and w is a valid witness for x, then output w.

7. The method of claim 1, wherein at least one or only one of the entities is trusted.

8. A system for generating a common reference string for use by multiple parties, the system comprising a computerized processor configured for:
   executing a generation algorithm locally on computerized processors at a set of parties, which generation algorithm receives as input a description of a sampler D and outputs a message for each party in the set, wherein the generation algorithm operates by:
   creating two respective codes for each of encryption program EP and decryption program DP;
   executing a procedure PROVE to create a non-interactive zero knowledge (NIZK) proof $\pi$, the proof $\pi$ proving that that EP was created correctly;
   creating a NIZK proof $\pi'$ that EP, DP, $\pi$ were jointly created correctly;
   generating an output determined in part based on EP, DP, $\pi$, and $\pi'$ as the message for each party;
   each party of the set of parties publishing their respective messages to a public domain;
   each party of the set of parties accessing the messages from the other parties in the set from the public domain; and
   executing a derivation algorithm locally at each party of the set of parties, which derivation algorithm derives a common reference string from the set of messages by combining the messages;
   wherein the derivation algorithm at each party in the set further comprises:
   retrieving from the public domain the messages published by the other parties;
   from each message from the other parties, extracting EP, DP, $\pi$, $\pi'$;
   executing a procedure VER to verify each of the NIZK proofs $\pi'$ received from each party;

combining all of the EP codes and all of the NIZK proofs π obtained from all of the parties in the set to generate a combined parameter set;

for each program DP from each party of the set, executing the respective DP program on the combined parameter set to generate a combined output d; and generating a final sample R as the common reference string derived from the combined output d and storing the common reference string in a computerized storage device.

9. The system of claim 8, wherein the distributed sampler satisfies the following security property: if a protocol that uses a sample R sampled from D is secure, then the protocol is also secure if R is sampled from the distributed sampler as in claim 1, assuming at least one of the entities generating R is trusted.

10. The system of claim 8, wherein the NIZK has properties of:

the procedure PROVE, which takes as input an NP statement x, an identity i, and witness w demonstrating that a is a true statement, and creates either the proof π or π';

a procedure VER, which takes as input an NP statement x, an identity i, and the proof π or π', and either accepts or rejects by:

if π or π' was created by procedure PROVE, then VER is guaranteed to accept;

if x is a false statement, then no efficient algorithm can compute i and π or π' such that VER accepts x, i, π or x, i, π', wherein this holds true even if an adversary is provided with multiple proofs of false statements using identities in set Q, as long as i∉Q; and a procedure EXTRACT, which takes as input the proof π or π', statement x, and a trapdoor $\tau_i$ for an identity i and outputs a witness w for the statement x.

11. The system of claim 10, wherein the procedure PROVE executes:

creating a commitment $c_0$ to an arbitrary string;

creating an extractable commitment $c_1$ to the witness w;

creating a non-interactive witness indistinguishable proof π* of a statement x* that either of the following are true:

w is a valid witness that a is true and $c_1$ is a valid commitment to the witness w; or CLOWF(w, i)=1 and $c_0$ is a valid commitment to w, where CLOW F is a challengeless labelled one-way function; and outputting the proof π as π=($c_0$, $c_1$, π*).

12. The system of claim 11, wherein a procedure VER is configured for verifying that π* is a valid non-interactive witness indistinguishable proof of the statement x*.

13. The system of claim 12, wherein a procedure EXTRACT is configured to:

execute procedure VER to obtain outcome bit b;

if b=0, then EXTRACT outputs a special symbol ⊥;

extract w from the extractable commitment $c_1$ and the trapdoor $\tau_i$;

if w is not a valid witness for x, then output ⊥; and if b=1 and w is a valid witness for x, then output w.

14. The system of claim 8, wherein at least one or only one of the entities is trusted.

15. A non-transitory processor-readable medium storing code representing instructions to be executed by a processor at a compute device for generating a common reference string, the code further comprising commands for:

executing a generation algorithm locally on computerized processors at a set of parties, which generation algorithm receives as input a description of a sampler D and outputs a message for each party in the set, wherein the generation algorithm operates by:

creating two respective codes for each of encryption program EP and decryption program DP;

executing a procedure PROVE to create a non-interactive zero knowledge (NIZK) proof π, the proof π proving that that EP was created correctly;

creating a NIZK proof π' that EP, DP, π were jointly created correctly;

generating an output determined in part based on EP, DP, π, and π' as the message for each party;

each party of the set of parties publishing their respective messages to a public domain;

each party of the set of parties accessing the messages from the other parties in the set from the public domain; and executing a derivation algorithm locally at each party of the set of parties, which derivation algorithm derives a common reference string from the set of messages by combining the messages;

wherein the derivation algorithm at each party in the set further comprises:

retrieving from the public domain the messages published by the other parties;

from each message from the other parties, extracting EP, DP, π, π';

executing a procedure VER to verify each of the NIZK proofs π' received from each party;

combining all of the EP codes and all of the NIZK proofs π obtained from all of the parties in the set to generate a combined parameter set;

for each program DP from each party of the set, executing the respective DP program on the combined parameter set to generate a combined output d; and generating a final sample R as the common reference string derived from the combined output d and storing the common reference string in a computerized storage device.

16. The media of claim 15, wherein the distributed sampler satisfies the following security property: if a protocol that uses a sample R sampled from D is secure, then the protocol is also secure if R is sampled from the distributed sampler as in claim 1, assuming at least one of the entities generating R is trusted.

17. The media of claim 15, wherein the NIZK has properties of:

the procedure PROVE, which takes as input an NP statement x, an identity i, and witness w demonstrating that x is a true statement, and creates either the proof π or π';

a procedure VER, which takes as input an NP statement x, an identity i, and the proof π or π', and either accepts or rejects by:

if π or π' was created by procedure PROVE, then VER is guaranteed to accept;

if x is a false statement, then no efficient algorithm can compute i and π or π' such that VER accepts x, i, π or x, i, π', wherein this holds true even if an adversary is provided with multiple proofs of false statements using identities in set Q, as long as i∉Q; and a procedure EXTRACT, which takes as input the proof π or π', statement x, and a trapdoor $\tau_i$ for an identity i and outputs a witness w for the statement x.

18. The media of claim 17, wherein the procedure PROVE executes:
- creating a commitment $c_0$ to an arbitrary string;
- creating an extractable commitment $c_1$ to the witness w;
- creating a non-interactive witness indistinguishable proof $\pi^*$ of a statement $x^*$ that either of the following are true:
- w is a valid witness that x is true and $c_1$ is a valid commitment to the witness w; or
- CLOWF(w, i)=1 and $c_0$ is a valid commitment to w, where CLOW F is a challengeless labelled one-way function; and
- outputting the proof $\pi$ as $\pi=(c_0, c_1, \pi^*)$.

19. The media of claim 18, wherein a procedure VER is configured for verifying that $\pi^*$ is a valid non-interactive witness indistinguishable proof of the statement $x^*$.

20. The media of claim 19, wherein a procedure EXTRACT is configured to:
- execute procedure VER to obtain outcome bit b;
- if b=0, then EXTRACT outputs a special symbol $\perp$;
- extract w from the extractable commitment $c_1$ and the trapdoor $\tau_i$;
- if w is not a valid witness for x, then output $\perp$; and
- if b=1 and w is a valid witness for x, then output w.

* * * * *